US012669908B2

(12) United States Patent
Wang et al.

(10) Patent No.: US 12,669,908 B2
(45) Date of Patent: Jun. 30, 2026

(54) TOUCH LAYER GROUP AND TOUCH DISPLAY APPARATUS

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Yu Wang, Beijing (CN); Yi Zhang, Beijing (CN); Chang Luo, Beijing (CN); Yuanqi Zhang, Beijing (CN); Ping Wen, Beijing (CN); Shun Zhang, Beijing (CN); Yang Zeng, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/010,784

(22) Filed: Jan. 6, 2025

(65) Prior Publication Data

US 2025/0138689 A1     May 1, 2025

Related U.S. Application Data

(63) Continuation of application No. 18/043,185, filed as application No. PCT/CN2022/088581 on Apr. 22, 2022, now Pat. No. 12,223,148.

(51) Int. Cl.
G06F 3/044          (2006.01)
G06F 3/041          (2006.01)
(52) U.S. Cl.
CPC .......... G06F 3/0446 (2019.05); G06F 3/0412 (2013.01); G06F 3/04164 (2019.05); G06F 2203/04107 (2013.01)

(58) Field of Classification Search
CPC .. G06F 3/0446; G06F 3/0412; G06F 3/04164; G06F 3/0443; G06F 3/041; G06F 3/044; G06F 2203/04107
See application file for complete search history.

(56) References Cited

U.S. PATENT DOCUMENTS

| | | | |
|---|---|---|---|
| 2016/0026293 A1* | 1/2016 | Kim ...................... | G06F 3/0446 345/173 |
| 2019/0302942 A1* | 10/2019 | Kim ...................... | H10K 59/88 |

FOREIGN PATENT DOCUMENTS

| | | | |
|---|---|---|---|
| TW | 1534680 B | * | 5/2016 |

* cited by examiner

*Primary Examiner* — Brent D Castiaux
(74) *Attorney, Agent, or Firm* — Dority & Manning, P.A.

(57) ABSTRACT

A touch layer group includes first and second touch electrodes, first and second touch lines and a shielding line. The first touch lines are electrically connected to the first touch electrodes, respectively. The second touch lines are electrically connected to the second touch electrodes, respectively. The first and second touch lines each extend to a peripheral region. The shielding line is located in the peripheral region and located between a first touch line and a second touch line that are adjacent to each other. The shielding line includes at least one first line segment and at least one second line segment. Each second line segment includes shielding sub-lines; shielding sub-lines of a second line segment are electrically connected to a first line segment, and a width of a region where the shielding sub-lines of the second line segment are located is greater than a width of the first line segment.

20 Claims, 10 Drawing Sheets

100

200

AA
22
21
BB

Y
X
23  25  24

I-I'

200

J-J'

TOUCH LAYER GROUP AND TOUCH DISPLAY APPARATUS

CROSS-REFERENCE TO RELATED APPLICATIONS

The application is a continuation of U.S. patent application Ser. No. 18/043,185, filed on Feb. 27, 2023, which claims priority to International Patent Application No. PCT/CN2022/088581, filed on Apr. 22, 2022, which are incorporated herein by reference in their entirety.

TECHNICAL FIELD

The present disclosure relates to the field of touch technologies, and in particular, to a touch layer group and a touch display apparatus.

BACKGROUND

With the development of display technologies, display apparatuses each having a touch function are getting popular due to their simple and convenient operations that provide good use experience for users. A touch display apparatus includes a touch sensing layer and a display substrate, and the touch sensing layer is disposed on a light exit side of the display substrate to facilitate a touch operation.

SUMMARY

In an aspect, a touch layer group is provided. The touch layer group has a touch region and a peripheral region. The touch layer group includes a plurality of first touch electrodes, a plurality of second touch electrodes, a plurality of first touch lines, a plurality of second touch lines and a shielding line. The plurality of first touch electrodes and the plurality of second touch electrodes are located in the touch region. The plurality of first touch lines are electrically connected to the plurality of first touch electrodes, respectively; the plurality of first touch lines each extend to the peripheral region. The plurality of second touch lines are electrically connected to the plurality of second touch electrodes, respectively; the plurality of second touch lines each extend to the peripheral region. The shielding line is located in the peripheral region and located between a first touch line and a second touch line that are adjacent to each other. The shielding line includes at least one first line segment and at least one second line segment. Each second line segment includes a plurality of shielding sub-lines, and the plurality of shielding sub-lines of each second line segment each extend in a same direction and are spaced apart from one another; a plurality of shielding sub-lines of a second line segment are all electrically connected to a first line segment, and a width of a region where the plurality of shielding sub-lines of the second line segment are located is greater than a width of the first line segment.

In some embodiments, the touch region includes a first edge, the peripheral region includes a first fan-out region connected to the first edge of the touch region; the at least one second line segment includes a first second line segment, the first fan-out region is provided with the first second line segment therein, and all shielding sub-lines of the first second line segment each extend towards a direction far away from the touch region.

In some embodiments, the at least one first line segment includes a first first line segment, the first fan-out region is further provided with the first first line segment therein, and the first first line segment extends along the first edge of the touch region; ends, proximate to the touch region, of all the shielding sub-line of the first second line segment are electrically connected to the first first line segment.

In some embodiments, a width of the first first line segment is 1.3 to 1.7 times a width of any shielding sub-line of the first second line segment.

In some embodiments, a width of a region where the first second line segment is located is 3 to 4.5 times a width of the first first line segment.

In some embodiments, the touch region is substantially in a shape of a rectangle; the touch region includes the first edge, a second edge, a third edge and a fourth edge; wherein the first edge is opposite to the second edge, and the third edge is opposite to the fourth edge; a length of the first edge is equal to a length of the second edge, a length of the third edge is equal to a length of the fourth edge, and the length of the first edge is less than the length of the third edge.

A part of first touch lines of the plurality of first touch lines are led out to the first fan-out region from the first edge, and another part of first touch lines of the plurality of first touch lines are led out from the second edge and extend to the first fan-out region through a fourth side of the touch region; the plurality of second touch lines are led out to the first fan-out region from the third edge; the fourth side of the touch region is a portion of the peripheral region adjacent to the fourth edge. Portions, located in the first fan-out region, of the part of first touch lines and portions, located in the first fan-out region, of the plurality of second touch lines are respectively located on two sides of the shielding line.

In some embodiments, a portion, located in the first fan-out region, of at least one first touch line of the part of first touch lines includes a first touch sub-line and a second touch sub-line that are connected to each other; the first touch sub-line and the first first line segment extend in a same direction, and the second touch sub-line and the first second line segment extend in another same direction.

A portion, located in the first fan-out region, of at least one second touch line of the plurality of second touch lines includes a third touch sub-line and a fourth touch sub-line that are connected to each other; the third touch sub-line and the first first line segment extend in the same direction, and the fourth touch sub-line and the first second line segment extend in the another same direction. The first touch sub-line and the third touch sub-line are respectively located on two sides of the first first line segment, and the second touch sub-line and the fourth touch sub-line are respectively located on two sides of the first second line segment.

In some embodiments, a width of the first first line segment is 1.3 to 1.7 times a width of the first touch sub-line, and the width of the first first line segment is 2 to 6 times a width of the third touch sub-line.

And/or a difference between a width of each shielding sub-line of the first second line segment and a width of the second touch sub-line is less than or equal to 40% of the width of the second touch sub-line; a difference between the width of each shielding sub-line of the first second line segment and a width of the fourth touch sub-line is less than or equal to 40% of the width of the fourth touch sub-line.

In some embodiments, the plurality of first touch electrodes each extend in a first direction, the plurality of second touch electrodes each extend in a second direction, and the plurality of first touch electrodes cross and are insulated from the plurality of second touch electrodes. The first direction is a direction parallel to the third edge, and the second direction is a direction parallel to the first edge.

In some embodiments, the peripheral region includes a first fan-out region connected to a first edge of the touch region, a bending region located on a side of the first fan-out region away from the touch region, and a lead-out region located on a side of the bending region away from the first fan-out region. The at least one second line segment includes a second second line segment, the lead-out region is provided with the second second line segment therein, and all shielding sub-lines of the second second line segment each extend towards a direction far away from the touch region.

In some embodiments, at least portion of the second second line segment progressively approaches a central axis of the touch region from an end proximate to the touch region to another end away from the touch region.

In some embodiments, the at least one second line segment further includes a third second line segment, the lead-out region is further provided with the third second line segment therein, and the third second line segment substantially extends in a direction parallel to the first edge; ends of all shielding sub-lines of the third second line segment are respectively connected to ends, away from the touch region, of all the shielding sub-lines of the second second line segment.

In some embodiments, the peripheral region further includes a bonding region located on a side of the lead-out region away from the bending region. The bonding region is provided with ground pins therein.

The at least one second line segment further includes a fourth second line segment, the lead-out region is further provided with the fourth second line segment, and the fourth second line segment extends towards the direction far away from the touch region; ends, away from the touch region, of all shielding sub-lines of the fourth second line segment are respectively connected to the ground pins, and another ends, proximate to the touch region, of all the shielding sub-lines of the fourth second line segment are respectively connected to another ends of all the shielding sub-lines of the third second line segment.

In some embodiments, a distance between two adjacent shielding sub-lines of the fourth second line segment is greater than a distance between two adjacent shielding sub-lines of the third second line segment.

In some embodiments, the peripheral region further includes a bonding region located on a side of the lead-out region away from the bending region. The bonding region is provided with a ground pin therein.

The at least one first line segment includes a second first line segment, the lead-out region is further provided with the second first line segment, and the second first line segment extends towards the direction far away from the touch region; an end of the second first line segment is connected to the ground pin, and another end of the second first line segment is connected to all the shielding sub-lines of the third second line segment.

In some embodiments, in the lead-out region, a difference between a width of the second first line segment and a width of any shielding sub-line is less than or equal to 40% of the width of the any shielding sub-line.

In some embodiments, in the lead-out region, a difference between the width of the any shielding sub-line and a width of the first touch line is less than or equal to 40% of the width of the first touch line; and/or a difference between the width of the any shielding sub-line and a width of the second touch line is less than or equal to 40% of the width of the second touch line.

In some embodiments, each first touch electrode of the plurality of first touch electrodes is of a one-piece structure;

each second touch electrode of the plurality of second touch electrodes includes a plurality of touch sub-electrodes and at least one bridging portion; two adjacent touch sub-electrodes of the second touch electrode are spaced apart by a single first touch electrode.

The touch layer group includes an insulating layer and two conductive layers, and the insulating layer is located between the two conductive layers. The plurality of first touch electrodes and the plurality of touch sub-electrodes are located in a conductive layer of the two conductive layers; bridging portions are located in another conductive layer of the two conductive layers, and a bridging portion is electrically connected to the two adjacent touch sub-electrodes through respective via holes in the insulating layer.

In some embodiments, at least one shielding sub-line of the second line segment is of a single-layer line or a double-layer line. In a case where the plurality of shielding sub-lines of the second line segment are each of the single-layer line, the plurality of shielding sub-lines are located in a same conductive layer, or the plurality of shielding sub-lines are located in the two conductive layers, at least one shielding sub-line located in one of the conductive layers at least partially overlaps with at least one shielding sub-line located in another of the conductive layers in a direction perpendicular to the touch layer group.

In some embodiments, the touch layer group includes a plurality of first-type touch lines and a plurality of second-type touch lines. The touch layer group comprises two conductive layers, the plurality of first-type touch lines and the plurality of second-type touch lines are respectively disposed in the two conductive layers, and a first-type touch line at least partially overlaps with a second-type touch line in a direction perpendicular to the touch layer group. The plurality of first-type touch lines include a part of the first touch lines and a part of the second touch lines, and the plurality of second-type touch lines include another part of the first touch lines and another part of the second touch lines.

In another aspect, a touch display apparatus is provided. The touch display apparatus includes a display substrate and the touch layer group that is as described in any one of the above embodiments. The touch layer group is located on a display surface of the display substrate. The display substrate includes a display region; edges of the touch region of the touch layer group substantially coincide with edges of the display region.

In some embodiments, the peripheral region includes a first fan-out region connected to a first edge of the touch region, a bending region located on a side of the first fan-out region away from the touch region, and a lead-out region located on a side of the bending region away from the first fan-out region; the touch layer group includes a first second line segment located in the first fan-out region and a second second line segment located in the lead-out region, a portion of the display substrate corresponding to the bending region is provided with a plurality of wire jumpers therein; a shielding sub-line of the first second line segment is electrically connected to a shielding sub-line of the second second line segment via at least one wire jumper.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figures 1, 2A:
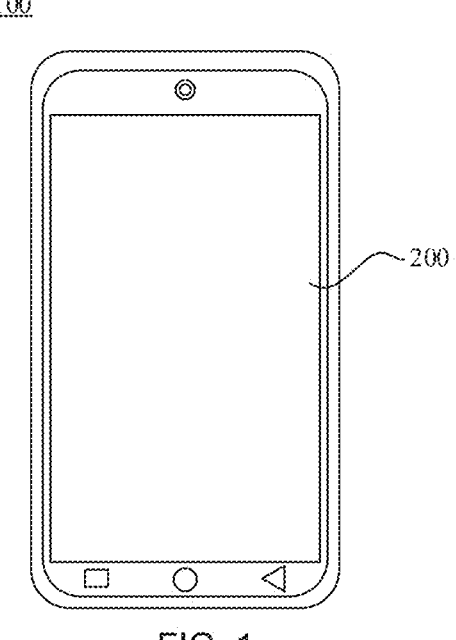
FIG. 1 is a structural diagram of a touch display apparatus, in accordance with some embodiments.
FIG. 2A is a structural diagram of a touch layer group, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "some embodiments", "example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms such as "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

Additionally, the phase "based on" as used herein is meant to be open and inclusive, since a process, a step, a calculation or other action that is "based on" one or more of stated conditions or values may, in practice, be based on additional conditions or values beyond those stated.

As used herein, the term such as "substantially" or "approximately" includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

As used herein, the term such as "parallel", "perpendicular" or "equal" includes a stated condition and a condition similar to the stated condition, a range of the similar condition is within an acceptable range of deviation, and the acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be that, for example, a difference between the two that are equal is less than or equal to 5% of either of the two.

It will be understood that, in a case where a layer or an element is referred to as being on another layer or a substrate, it may be that the layer or the element is directly on the another layer or the substrate, or there may be a middle layer between the layer or the element and the another layer or the substrate.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a touch display apparatus. The touch display apparatus may be a liquid crystal display (LCD) having a touch function. Alternatively, the touch display apparatus may be a self-luminous display apparatus having a touch function, such as an electroluminescent display apparatus having a touch function or a photoluminescent display apparatus having a touch function. In a case where the touch display apparatus is the electroluminescent display apparatus having the touch function, the electroluminescent display apparatus may be an organic light-emitting diode (OLED) display apparatus or a quantum dot light emitting diodes (QLED) display apparatus. In a case where the touch display apparatus is the photoluminescent display apparatus having the touch function, the photoluminescent display apparatus may be a quantum dot photoluminescent display apparatus. A type of the touch display apparatus is not limited in the present disclosure.

Referring to FIG. 1, the touch display apparatus 100 involved in the embodiments of the present disclosure may be, for example, a tablet computer, a mobile phone, an electronic reader, a remote controller, a personal computer (PC), a notebook computer, a personal digital assistant (PDA), a vehicle-mounted device, a network television, a wearable device, a television.

Figure 2B:
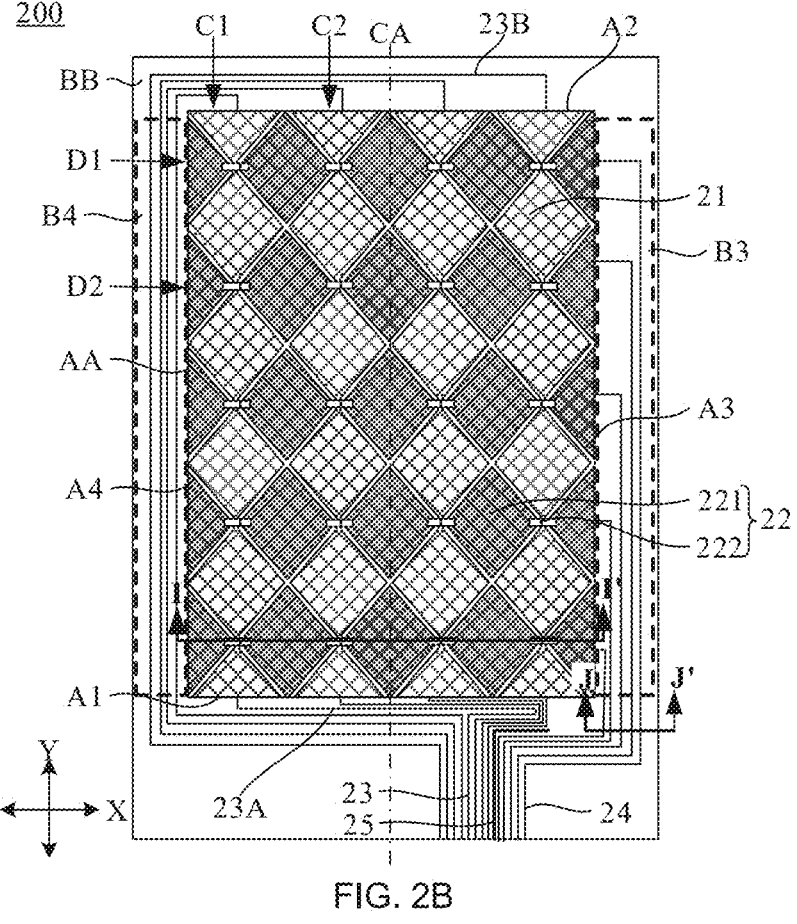
FIG. 2B is a structural diagram of another touch layer group, in accordance with some embodiments.

Referring to FIGS. 2A and 2B, the touch display apparatus includes a touch layer group 200. The touch layer group 200 may detect a touch position of a finger, so as to input a touch command to the touch display apparatus 100.

Some embodiments of the present disclosure provide a touch layer group 200, referring to FIGS. 2A and 2B, the touch layer group 200 includes a touch region AA and a peripheral region BB.

Referring to FIGS. 2A and 2B, the touch layer group 200 includes a plurality of first touch electrodes 21, a plurality of second touch electrodes 22, a plurality of first touch lines 23, a plurality of second touch lines 24 and a shielding line 25.

Firstly, the first touch electrodes 21 and the second touch electrodes 22 will be described.

In some embodiments, referring to FIG. 2A, the plurality of first touch electrodes 21 each extend in a first direction Y, the plurality of second touch electrodes 22 each extend in a second direction X, and the plurality of first touch electrodes 21 cross and are insulated from the plurality of second touch electrodes 22.

Shapes of the first touch electrodes 21, the number of the first touch electrodes 21, shapes of the second touch electrodes 22 and the number of the second touch electrodes 22 are not limited, and may be set according to actual needs, as long as a position of a touch point can be determined by detecting capacitances.

For example, referring to FIG. 2A, the first touch electrodes 21 and the second touch electrodes 22 are each in a shape of a strip. In this case, there is an overlapping region between a first touch electrode 21 and a second touch electrode 22. That is, the first touch electrode 21 and the second touch electrode 22 have a certain overlapping area therebetween. The first touch electrode 21 is insulated from the second touch electrode 22. For example, an insulating layer is provided between the first touch electrode 21 and the second touch electrode 22, so that the first touch electrode 21 is insulated from the second touch electrode 22 by the insulating layer. Thus, a capacitance is created in the overlapping region between the first touch electrode 21 and the second touch electrode 22, and the original capacitance in this region will be changed when a conductor (e.g., a finger) touches the overlapping region. Therefore, a change in capacitance is detected, thereby determining the position of the touch point.

In some other examples, referring to FIG. 2B, the plurality of first touch electrodes 21 and the plurality of second touch electrodes 22 are all located in the touch region AA. The plurality of first touch electrodes 21 and the plurality of second touch electrodes 22 intersect one another in both the first direction Y and the second direction X, and are disposed in a same layer. The first direction Y intersects the second direction X. In some examples, the first direction Y is perpendicular to the second direction X.

In some embodiments, referring to FIG. 2B, the second touch electrode 22 further includes a plurality of touch sub-electrodes 221 and bridging portions 222. Two adjacent touch sub-electrodes 221 in the second direction X are electrically connected to each other via a bridging portion 222. The plurality of first touch electrodes 21 and the plurality of touch sub-electrodes 221 are synchronously formed, by using a patterning process (e.g., including exposure, development and etching), in a same layer and are made of a same material. Although the first touch electrodes 21 and the touch sub-electrodes 221 are disposed in the same layer, the first touch electrodes 21 are insulated from the touch sub-electrodes 221.

Referring to FIG. 2B, the plurality of first touch electrodes 21 are divided into a plurality of columns of first touch electrodes in the first direction Y; first touch electrodes 21 located in a same column are coupled to one another, and two adjacent columns of first touch electrodes 21 in the plurality of columns of first touch electrodes 21 are insulated from each other. For example, first touch electrodes 21 in a first column C1 are coupled to one another in the first direction Y, and the first touch electrodes 21 in the first column C1 are insulated from first touch electrodes 21 in a second column C2. Each column of first touch electrodes 21 may serve, for example, as a first channel, and the first channel is used for transmitting a first touch signal.

The plurality of second touch electrodes 22 are divided into a plurality of rows of second touch electrodes in the second direction X; second touch electrodes 22 located in a same row are coupled to one another, and two adjacent rows of second touch electrodes 22 in the plurality of rows of second touch electrodes 22 are insulated from each other. For example, second touch electrodes 22 in a first row D1 are coupled to one another in the second direction X, and the second touch electrodes 22 in the first row D1 are insulated from second touch electrodes 22 in a second row D2. Each row of second touch electrodes may serve, for example, as a second channel, and the second channel is used for transmitting a second touch signal.

In some embodiments, the first touch electrode 21 and the second touch electrode 22 are each of a grid-shape structure.

The first touch electrode 21 may be a touch transmitting electrode (Tx), and the second touch electrode 22 may be a touch receiving electrode (Rx); alternatively, the first touch electrode 21 may be the Rx, and the second touch electrode 22 may be the Tx, which is not limited in the embodiments of the present disclosure.

Referring to FIGS. 2A and 2B, the touch layer group 200 further includes a plurality of first touch lines 23 and a plurality of second touch lines 24. The plurality of first touch lines 23 are electrically connected to the plurality of first touch electrodes 21, respectively, and the plurality of first touch lines 23 each extend to the peripheral region BB. The plurality of second touch lines 24 are electrically connected to the plurality of second touch electrodes 22, respectively, and the plurality of second touch lines 24 each extend to the peripheral region BB. A first touch line 23 is electrically connected to a column of first touch electrodes 21, and a second touch line 24 is electrically connected to a row of second touch electrodes 22.

The touch layer group 200 further includes a shielding line 25. The shielding line 25 is located in the peripheral region BB and located between a first touch line 23 and a second touch line 24 that are adjacent to each other.

The first touch line 23 is used for transmitting the first touch signal, the second touch line 24 is used for transmitting the second touch signal, and the signal transmitted by the first touch line 23 is different from the signal transmitted by the second touch line 24. The first touch signal on the first touch line 23 may interfere with the second touch signal on the second touch line 24. Similarly, the second touch signal on the second touch line 24 may interfere with the first touch signal on the first touch line 23.

In the embodiments of the present disclosure, the shielding line 25 is disposed between the first touch line 23 and the second touch line 24 that are adjacent to each other to separate the first touch line 23 from the second touch line 24, thereby avoiding the mutual interference between the first touch line 23 and the second touch line 24.

The shielding line 25 and the first touch line 23 have a distance therebetween, so as to avoid a short circuit of the first touch line 23 and the shielding line 25. The shielding line 25 and the second touch line 24 have a distance therebetween, so as to avoid a short circuit of the second touch line 24 and the shielding line 25.

Figure 3:
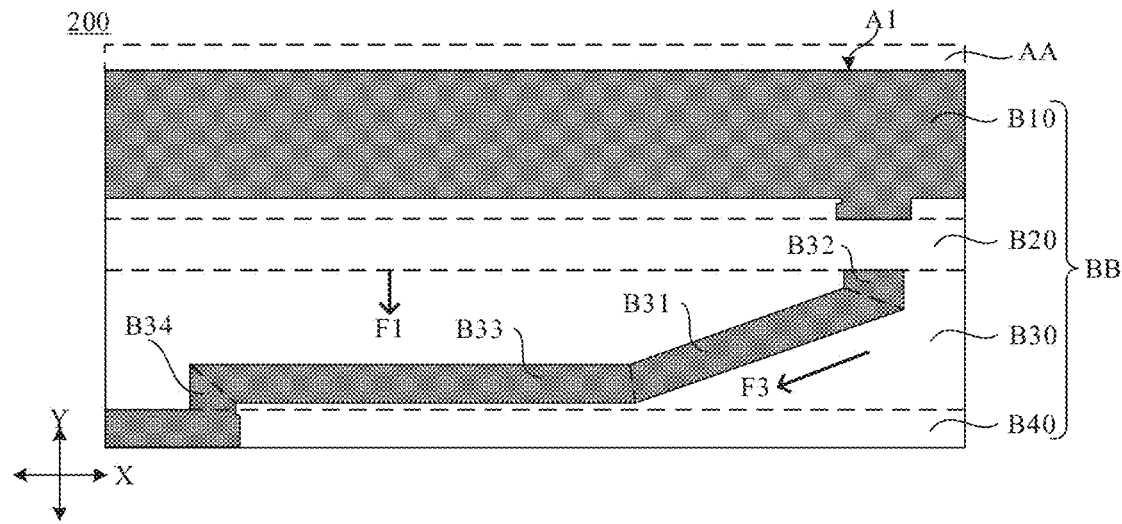
FIG. 3 is a structural diagram of yet another touch layer group, in accordance with some embodiments.

In an implementation, each portion of the shielding line 25 has an equal width. The peripheral region BB of the touch layer group 200 may include a plurality of regions, such as a first fan-out region B10, a bending region B20 and a lead-out region B30, referring to FIG. 3, FIG. 3 shows a structure of a part of the regions of the peripheral region BB. Since a wiring space in a different region is different in size, wiring requirements are different. Thus, in a case where each portion of the shielding line 25 has an equal width, the wiring requirements in the different regions cannot be satisfied. For example, in a case where the shielding line 25 is set relatively wide, as for a region (e.g., the first fan-out region B10) with a relatively small wiring space, each of widths of touch lines (including the first touch line 23 and the second touch line 24), in the first fan-out region B10, need to be set relatively small. In this case, a difference between the width of the shielding line 25 and the width of the touch line is increased, so that a uniformity of etching is reduced, and thus, in the case where each portion of the shielding line 25 has an equal width, the wiring requirements in the different regions cannot be satisfied. Moreover, in the first fan-out region B10, a distance between the touch lines and a distance between the touch line and the shielding line 25 are both relatively small, so that an interference between the touch lines and an interference between the touch line and the shielding line 25 are both prone to be increased, and coupling between the touch lines and coupling between the touch line and the shielding line 25 are both prone to occur. In a case where the shielding line 25 is set relatively narrow, as for a region (e.g., the lead-out region B30) with a relatively large space, each of widths of the touch lines, in the lead-out region B30, may be set relatively large, so as to reduce resistance of the touch line. In this case, the shielding line 25 is set relatively narrow, which results in an insufficient shielding effect of the shielding line 25, so that the interference occurs between the first touch line 23 and the second touch line 24.

Figure 4:
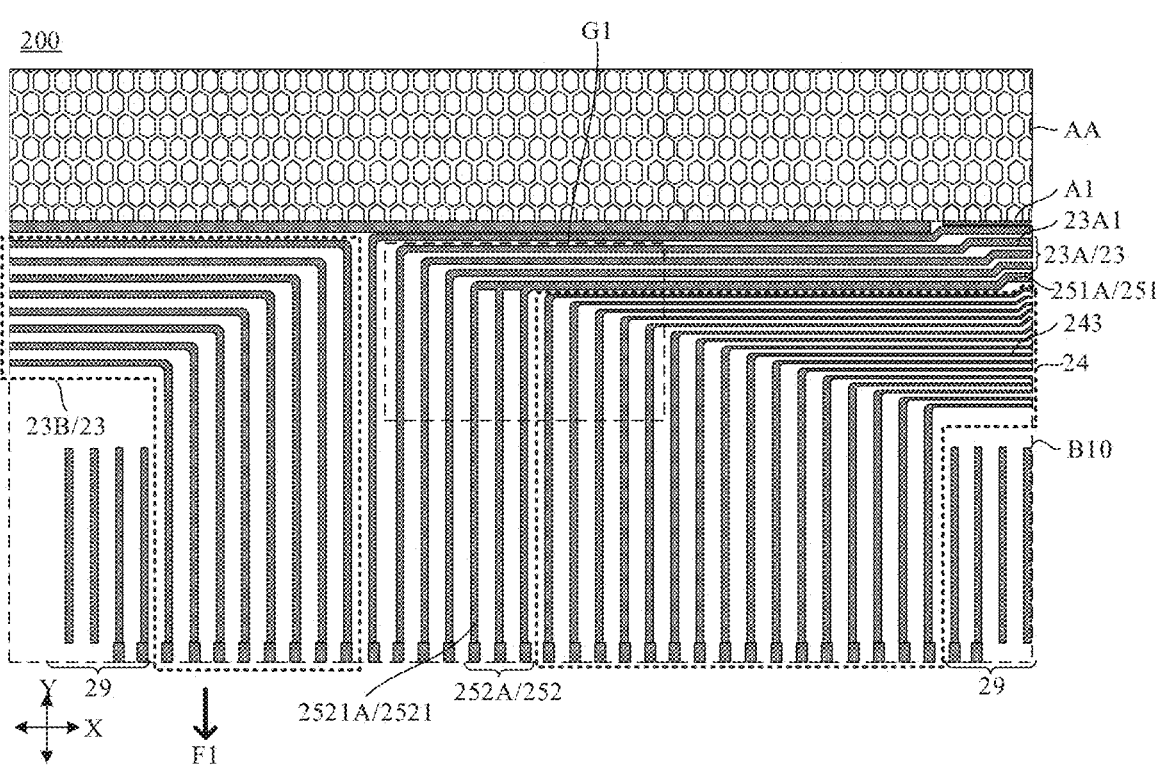
FIG. 4 is a structural diagram of yet another touch layer group, in accordance with some embodiments.

In the touch layer group 200 provided in some embodiments of the present disclosure, referring to FIG. 4, the shielding line 25 includes first line segment(s) 251 and second line segment(s) 252, and a width of a second line segment 252 is greater than a width of a first line segment 251.

The first line segment 251 may be provided in the region (e.g., the first fan-out region B10) with a relatively small space. Since the width of the first line segment 251 is relatively small, a difference between the width of the first line segment 251 and the width of the touch line, in the first fan-out region B10, is relatively small. Therefore, the uniformity of etching may be improved. In addition, there may be a large space in the first fan-out region B10 for arranging the touch lines, so that the width of the touch line may be set relatively large. As a result, the difference between the width of the shielding line 25 and the width of the touch line is further decreased, so that the uniformity of etching is improved. Besides, the width of the touch line is set relatively large, so that the resistance of the touch line may be reduced. Furthermore, in the first fan-out region B10, the distance between the touch lines and the distance between the touch line and the shielding line 25 are both relatively large, so that the interference between the touch lines and the interference between the touch line and the shielding line 25 are both decreased, and the coupling between the touch lines and the coupling between the touch line and the shielding line 25 are both not prone to occur.

The second line segment 252 is provided in the region (e.g., the lead-out region B30) with a relatively large space. The space of the lead-out region B30 is relatively large, so that the space arranging the touch lines is not compressed due to the provision of the second line segment 252, and the shielding effect of the shielding line 25 in the region with the relatively large space may be improved.

In summary, the first line segment 251 and the second line segment 252 each having a different width are disposed in the peripheral region BB, so that the wiring requirements in the different regions may be satisfied.

Figure 5:
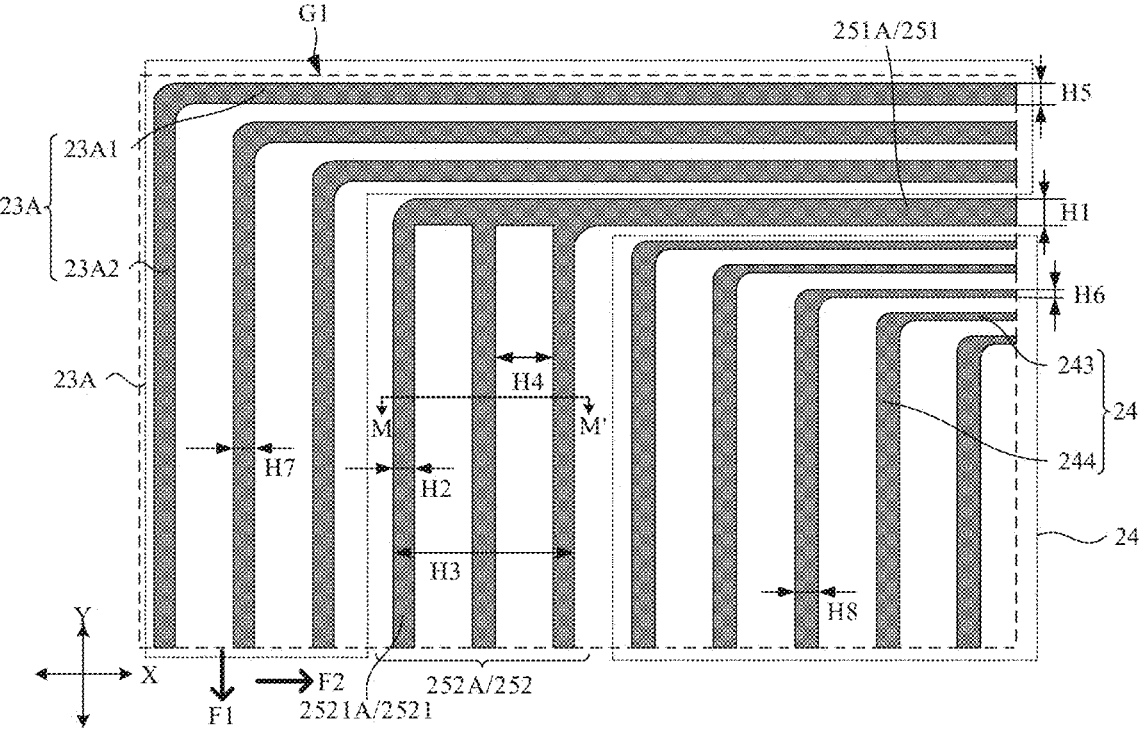
FIG. 5 is a partial enlargement view of the G1 region in FIG. 4.

Referring to FIG. 4, the second line segment 252 includes a plurality of shielding sub-lines 2521. The plurality of shielding sub-lines 2521 are electrically connected to the first line segment 251, the plurality of shielding sub-lines 2521 each extend in a same direction (the direction Y as shown in FIG. 4) and are spaced apart from one another, and a width of a region where the plurality of shielding sub-lines 2521 are located is greater than the width of the first line segment 251. For example, as shown in FIG. 5, in the first fan-out region B10, the width of the first line segment 251 (i.e., a first first line segment 251A will be described below) is represented as H1, the width of the region where the plurality of shielding sub-lines 2521 (i.e., a plurality of shielding sub-lines 2521A of a first second line segment 252A will be described below) are located is represented as H3, and H3 is greater than H1 (H3>H1).

The second line segment 252 includes the plurality of shielding sub-lines 2521, and two adjacent shielding sub-lines 2521 have a distance therebetween, so that the two adjacent shielding sub-lines 2521 are spaced apart from each other.

The second line segment 252 of the shielding line 25 is divided into the plurality of shielding sub-lines 2521, so that a difference between a width of a shielding sub-line 2521 and the width of the first touch line 23 and a difference between the width of the shielding sub-line 2521 and the width of the second touch line 24 are both relatively small. As a result, the uniformity of etching may be improved.

In addition, static electricity generated by a line with a different width is different, and a mutual capacitance generated between the line and another line adjacent thereto is different, so that a signal environment created by the line with the different width is different. Therefore, in some embodiments provided in the present disclosure, a difference between a signal environment of a first touch line 23 proximate to the shielding sub-line 2521 and a signal environment of a first touch line 23 away from the shielding sub-line 2521 is relatively small, so that a difference in touch electrical property between the first touch line 23 proximate to the shielding sub-line 2521 and the first touch line 23 away from the shielding sub-line 2521 is relatively small. Similarly, a difference in touch electrical property between a second touch line 24 proximate to the shielding sub-line 2521 and a second touch line 24 away from the shielding sub-line 2521 is relatively small. As a result, a touch accuracy of the touch layer group 200 may be improved.

Figures 6A, 6B:
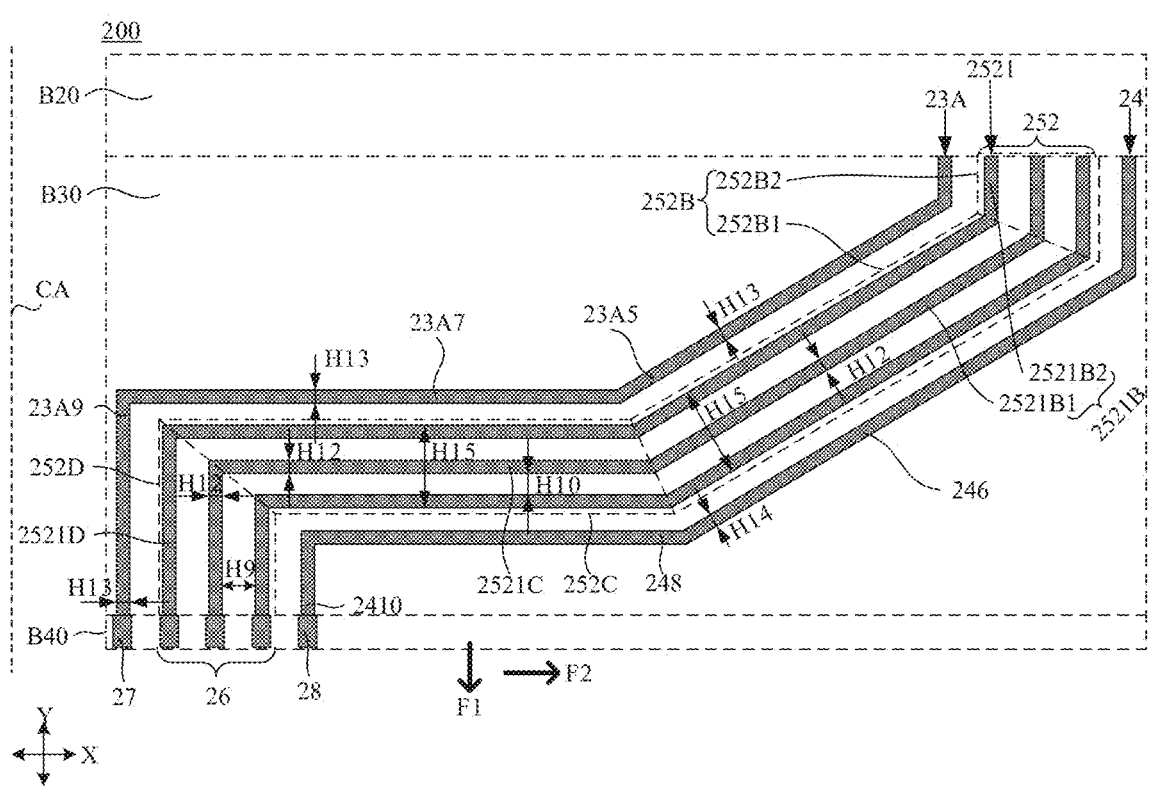
FIG. 6A is a structural diagram of yet another touch layer group, in accordance with some embodiments.
FIG. 6B is a structural diagram of yet another touch layer group, in accordance with some embodiments.

In some embodiments, referring to FIG. 3, the peripheral region BB includes a first fan-out region B10 connected to a first edge A1 of the touch region AA. A bending region B20, a lead-out region B30 and a bonding region B40 are sequentially provided on a side of the first fan-out region B10 away from the touch region AA. The bonding region B40 is provided with ground pin(s) 26 therein, and the ground pin(s) 26 are not shown in FIG. 3 and may be as shown in FIGS. 6A and 6B. The shielding line 25 may pass through the first fan-out region B10 to be electrically connected to the ground pin(s) 26. The shielding line 25 may be grounded due to a fact that the ground pin(s) 26 are grounded, so that static electricity accumulated in the shielding line 25 may be led out.

In some embodiments, referring to FIG. 4, the first fan-out region B10 is provided with a first second line segment 252A therein, and each shielding sub-line 2521 of the first second line segment 252A extends towards a direction far away from the touch region AA.

Each shielding sub-line 2521 of the first second line segment 252A extends towards the direction far away from the touch region AA. That is, the first second line segment 252A extends towards a direction close to the ground pin(s) 26 (as shown in FIGS. 6A and 6B), so that the shielding line 25 gradually approaches the ground pin(s) 26.

In some examples, a direction from the touch region AA to the first fan-out region B10 is a first designated direction, and the first designated direction is parallel to the first direction Y. Referring to FIG. 4, the direction indicated by the arrow F1 is the first designated direction. The first second line segment 252A may substantially extend in the first designated direction F1. The first second line segment 252A includes a plurality of shielding sub-lines 2521A, and each shielding sub-line 2521A of the first second line segment 252A substantially extends in the first designated direction F1. In the embodiments of the present disclosure, a description of "substantially extending in the first designated direction F1" refers to that an included angle between an extending direction of each shielding sub-line 2521A of the first second line segment 252A and the first designated direction F1 is within 5°.

In some embodiments, referring to FIGS. 4 and 5, the first fan-out region B10 is further provided with a first first line segment 251A therein, and the first first line segment 251A extends along the first edge A1 of the touch region AA. An end, proximate to the touch region AA, of each shielding sub-line 2521A of the first second line segment 252A is electrically connected to the first first line segment 251A.

In some examples, at least portion of a frame of the touch layer group 200 may be provided in the first fan-out region B10. Thus, in order to achieve a narrow frame, a dimension of the first fan-out region B10 in the first direction Y is limited.

The first first line segment 251A with a relatively small width is provided in the first fan-out region B10, which may reduce the dimension of the first fan-out region B10 in the first direction Y, so that a size of the frame of the touch layer group 200 may be reduced.

In some examples, referring to FIGS. 2B, 3, and 4, the first edge A1 extends in the second direction X.

In some embodiments, referring to FIG. 5, a width H1 of the first first line segment 251A is 1.3 to 1.7 times a width H2 of any shielding sub-line 2521A of the first second line segment 252A.

In some examples, referring to FIG. 5, the width H1 of the first first line segment 251A is a dimension of the first first line segment 251A in the first direction Y, the width H2 of any shielding sub-line 2521A of the first second line segment 252A is a dimension of any shielding sub-line 2521A of the first second line segment 252A in the second direction X, and the width H1 is greater than or equal to 1.3 times the width H2, and is less than or equal to 1.7 times the width H2 (1.3H2≤H1≤1.7H2).

The width H1 of the first first line segment 251A is greater than the width H2 of any shielding sub-line 2521A of the first second line segment 252A, and the width H1 is greater than or equal to 1.3 times the width H2, and is less than or equal to 1.7 times the width H2 (1.3H2≤H1≤1.7H2), which avoids a relatively large occupied space of the first fan-out region B10 in the first direction Y caused by a fact that the width H1 of the first first line segment 251A is too large due to a large difference (e.g., greater than 1.7 times H2) between the width H1 of the first first line segment 251A and the width H2 of any shielding sub-line 2521A of the first second line segment 252A. As a result, it is conducive to reducing the dimension of the first fan-out region B10 in the first direction Y. In addition, it is possible to avoid a reduction of the shielding effect caused by a fact that the width H1 of the first first line segment 251A is too small due to a small difference (e.g., less than 1.3 times H2) between the width H1 of the first first line segment 251A and the width H2 of any shielding sub-line 2521A of the first second line segment 252A.

In some examples, the width H1 of the first first line segment 251A is 1.4 to 1.6 times the width H2 of any shielding sub-line 2521A of the first second line segment 252A.

For example, the width H1 of the first first line segment 251A is 1.5 times the width H2 of any shielding sub-line 2521A of the first second line segment 252A.

The width H2 of each shielding sub-line 2521A of the first second line segment 252A may be equal.

In some examples, the width H1 of the first first line segment 251A may be in a range from 25 μm to 31 μm, inclusive (25 μm≤H1≤31 μm). For example, the width H1 of the first first line segment 251A is 28 μm.

In some examples, the width H2 of the shielding sub-line 2521A of the first second line segment 252A may be in a range from 17 μm to 23 μm, inclusive (17 μm≤H2≤23 μm). For example, the width H2 of the shielding sub-line 2521A of the first second line segment 252A is 20 μm.

In some embodiments, a width H3 of a region where the first second line segment 252A is located is 3 to 4.5 times the width H1 of the first first line segment 251A.

Referring to FIG. 5, the width H3 of the region where the first second line segment 252A is located is a dimension of the region where the first second line segment 252A is located in the second direction X, and the width H3 is greater than or equal to 3 times the width H1, and is less than or equal to 4.5 times the width H1 (3H1≤H3≤4.5H1). In this way, it is possible to avoid a relatively large occupied space of the first fan-out region B10 in the second direction X caused by a fact that the width H3 of the region where the first second line segment 252A is located is too large due to a large difference (e.g., greater than 4.5 times H1) between the width of the region where the first second line segment 252A is located and the width of the first first line segment 251A. In addition, it is possible to avoid the reduction of the shielding effect caused by a fact that the width H3 of the region where the first second line segment 252A is located is too small due to a small difference (e.g., less than 3 times H1) between the width H3 of the region where the first second line segment 252A is located and the width H1 of the first first line segment 251A.

In some examples, the width H3 of the region where the first second line segment 252A is located is 3.5 to 4.1 times the width H1 of the first first line segment 251A. For example, the width H3 of the region where the first second line segment 252A is located is 3.7 to 3.8 times the width H1 of the first first line segment 251A.

In some examples, the width H3 of the region where the first second line segment 252A is located may be in a range from 102 μm to 110 μm, inclusive (102 μm≤H3≤110 μm).

For example, the width H3 of the region where the first second line segment 252A is located is 106 μm.

There is a distance between two adjacent shielding sub-lines 2521. Referring to FIG. 5, the distance between two adjacent shielding sub-lines 2521A of the first second line segment 252A is represented as H4. In some examples, the width H4 is in a range from 20 μm to 26 μm, inclusive (20 μm≤H4≤26 μm). For example, the width H4 is 23 μm.

A portion of the shielding line 25 located in the first fan-out region B10 is described above. In addition to the shielding line 25, the first touch lines 23 and the second touch lines 24 both pass through the first fan-out region B10. Portions of the first touch line 23 and the second touch line 24 located in the first fan-out region B10 will be described below.

In some embodiments, referring to FIG. 2B, the touch region AA is substantially in a shape of a rectangle; the touch region AA includes a first edge A1, a second edge A2, a third edge A3 and a fourth edge A4. The first edge A1 is opposite to the second edge A2, and the third edge A3 is opposite to the fourth edge A4; a length of the first edge A1 is equal to a length of the second edge A2, a length of the third edge A3 is equal to a length of the fourth edge A4, and the length of the first edge A1 is less than the length of the third edge A3.

The first direction Y is a direction parallel to the third edge A3, and the second direction X is a direction parallel to the first edge A1.

The touch region AA is substantially in the shape of the rectangle. The description of "being substantially in the shape of the rectangle" may be in a shape of a regular rectangle or in a shape similar to the regular rectangle in which an included angle between two adjacent sides is substantially a right angle (for example, the included angle between the two adjacent sides is in a range from 85° to 95°), and/or each side is substantially a straight side, and/or two adjacent sides have a rounded corner therebetween.

Referring to FIG. 2B, a part of first touch lines 23A of the plurality of first touch lines 23 are led out to the first fan-out region B10 from the first edge A1, and another part of first touch lines 23B of the plurality of first touch lines 23 are led out from the second edge A2 and extend to the first fan-out region B10 through a fourth side B4 of the touch region AA.

The part of first touch lines 23A and the another part of first touch lines 23B are each a single integrated line.

An end of each of the part of first touch lines 23A is connected to a first touch electrode 21 at the first edge A1, and the other end of each of the part of first touch lines 23A is connected to a first pin 27. Each of the part of first touch lines 23A extends to the first pin 27 in the bonding region B40 through the first fan-out region B10. The first pin 27 is not shown in FIG. 3 and may be as shown in FIGS. 6A and 6B.

An end of each of the another part of first touch lines 23B is connected to another first touch electrode 21 at the second edge A2, and the other end of each of the another part of first touch lines 23B is connected to a first pin 27. Each of the another part of first touch lines 23B extends to the first pin 27 in the bonding region B40 through the fourth side of the touch region AA and the first fan-out region B10 in sequence. The fourth side B4 of the touch region AA is a portion of the peripheral region BB adjacent to the fourth edge A4. The first pin 27 is not shown in FIG. 3 and may be as shown in FIGS. 6A and 6B.

In some examples, there are multiple first touch lines in the part of first touch lines 23A, and there are multiple first touch lines in the another part of first touch lines 23B. Referring to FIG. 2B, the part of first touch lines 23A are each connected to a respective column of first touch electrodes 21 at the first edge A1, and the another part of first touch lines 23B are each connected to a respective column of first touch electrodes 21 at the second edge A2.

Referring to FIG. 2B, the plurality of second touch lines 24 are led out to the first fan-out region B10 from the third edge A3.

Referring to FIG. 2B, an end of each of the second touch lines 24 is connected to a second touch electrode 22 at the third edge A3, and the other end of each of the second touch lines 24 is connected to a second pin 28 (as shown in FIGS. 6A and 6B). Each of the second touch lines 24 extends, through a third side B3 of the touch region AA, the first fan-out region B10, the bending region B20 and the lead-out region B30 in sequence, to be electrically connected to the second pin 28 in the bonding region B40. The plurality of second touch lines 24 are each connected to a respective row of second touch electrodes 22 at the third edge A3. The third side B3 of the touch region AA is a portion of the peripheral region BB adjacent to the third edge A3.

A portion of each first touch line 23A of the part of first touch lines 23A is located in the first fan-out region B10, and a portion of each second touch line 24 is located in the first fan-out region B10.

In the first fan-out region B10, portions, located in the first fan-out region B10, of the part of first touch lines 23A and portions, located in the first fan-out region B10, of the plurality of second touch lines 24 are respectively located on two sides of the shielding line 25. Therefore, the shielding line 25 may avoid a mutual interference occurring between the part of first touch lines 23A and the second touch lines 24 in the first fan-out region B10.

In some embodiments, referring to FIG. 5, a portion, located in the first fan-out region B10, of at least one first touch line 23A of the part of first touch lines 23A includes a first touch sub-line 23A1 and a second touch sub-line 23A2 that are connected to each other.

The first touch sub-line 23A1 and the first first line segment 251A extend in a same direction. In this case, the first touch sub-line 23A1 is parallel to the first first line segment 251A.

The second touch sub-line 23A2 and the first second line segment 252A extend in another same direction. In this case, the second touch sub-line 23A2 is parallel to the shielding sub-lines 25 of the first second line segment 252A.

A portion, located in the first fan-out region B10, of at least one second touch line 24 of the plurality of second touch lines 24 includes a third touch sub-line 243 and a fourth touch sub-line 244 that are connected to each other.

The third touch sub-line 243 and the first first line segment 251A extend in the same direction. In this case, the third touch sub-line 243 is parallel to the first first line segment 251A.

The fourth touch sub-line 244 and the first second line segment 252A extend in the another same direction. In this case, the fourth touch sub-line 244 is parallel to the first second line segment 252A.

The first touch sub-line 23A1 and the third touch sub-line 243 are respectively located on two sides of the first first line segment 251A.

In some examples, referring to FIG. 4, first touch sub-lines 23A1 of the part 23A of the first touch lines are located between the first first line segment 251A and the touch region AA, and third touch sub-lines 243 of the plurality of second touch lines 24 are located on a side of the first first line segment 251A away from the touch region AA. In this case, the first touch sub-lines 23A1, the first first line segment 251A and the third touch sub-lines 243 are sequentially arranged in the first designated direction F1.

Referring to FIGS. 4 and 5, the second touch sub-line 23A2 and the fourth touch sub-line 244 are respectively located on two sides of the first second line segment 252A.

In some examples, referring to FIG. 5, the second touch sub-line 23A2, the first second line segment 252A and the fourth touch sub-line 244 are sequentially arranged in a second designated direction. Referring to FIG. 5, the direction indicated by the arrow F2 is the second designated direction. That is, a direction from the fourth edge A4 to the third edge A3 is the second designated direction F2.

In some embodiments, as shown in FIG. 5, the width H1 of the first first line segment 251A is 1.3 to 1.7 times a width H5 of the first touch sub-line 23A1.

The width H5 of the first touch sub-line 23A1 is a dimension of the first touch sub-line 23A1 in the first direction Y, and the width H1 is greater than or equal to 1.3 times the width H5, and is less than or equal to 1.7 times the width H5 $(1.3H5 \le H1 \le 1.7H5)$. In this way, it is possible to avoid a poor uniformity of etching caused by a large difference (e.g., greater than 1.7 times H5) between the width of the first first line segment 251A and the width of the first touch sub-line 23A1; in addition, it is possible to avoid the reduction of the shielding effect caused by a fact that the width H1 of the first first line segment 251A is too small due to a small difference (e.g., less than 1.3 times H5) between the width H1 of the first first line segment 251A and the width H5 of the first touch sub-line 23A1.

In some examples, the width H1 of the first first line segment 251A is 1.4 to 1.6 times the width H5 of the first touch sub-line 23A1.

For example, the width H1 of the first first line segment 251A is 1.5 times the width H5 of the first touch sub-line 23A1.

In some examples, the width H5 of the first touch sub-line 23A1 may be in a range from 17 μm to 23 μm, inclusive (17 μm$\le$H5$\le$23 μm). For example, the width H5 is equal to 20 μm (H5=20 μm).

In some embodiments, as shown in FIG. 5, the width H1 of the first first line segment 251A is 2 to 6 times a width H6 of the third touch sub-line 243.

The width H6 of the third touch sub-line 243 is a dimension of the third touch sub-line 243 in the first direction Y, and the width H1 is greater than or equal to 2 times the width H6, and is less than or equal to 6 times the width H6 $(2H6 \le H1 \le 6H6)$. In this way, it is possible to avoid a poor uniformity of etching caused by a large difference (e.g., greater than 6 times the width H6) between the width of the first first line segment 251A and the width of the third touch sub-line 243; in addition, it is possible to avoid the reduction of the shielding effect caused by a small difference (e.g., less than 2 times the width H6) between the width H1 of the first first line segment 251A and the width H6 of the third touch sub-line 243.

In some examples, the width H1 of the first first line segment 251A is 2.3 to 5.6 times the width H6 of the third touch sub-line 243.

In some examples, the width H6 of the third touch sub-line 243 may be in a range from 5 μm to 12 μm, inclusive (5 μm$\le$H6$\le$12 μm).

In some examples, the width H5 of the first touch sub-line 23A1 is greater than the width H6 of the third touch sub-line 243.

In some examples, the number of columns of the first touch electrodes 21 is less than the number of rows of the second touch electrodes 22, so that the number of first touch lines 23A of the part of first touch lines 23A is less than the number of the second touch lines 24. Thus, in the first fan-out region B10, the number of the first touch sub-lines 23A1 is less than the number of the third touch sub-lines 243. Therefore, the width H6 of the third touch sub-line 243 is less than the width H5 of the first touch sub-line 23A1, so that the width H6 of the third touch sub-line 243 is reduced. The width H6 of the third touch sub-line 243 is small, so that a dimension, in the first direction Y, of a region where the third touch sub-lines 243 are located may be reduced. As a result, it is conducive to achieving the narrow bezel of the touch layer group 200.

In some examples, a width of a portion, located on the third side of the touch region AA, of the second touch line 24 is small, so that a dimension, in the second direction X, of a region occupied by the second touch lines 24 located on the third side of the touch region AA is relatively small. As a result, it is conducive to achieving the narrow bezel of the touch layer group 200. The third side of the touch region AA is a portion of the peripheral region BB adjacent to the third edge A3.

In some embodiments, referring to FIG. 5, a difference between the width H2 of each shielding sub-line 2521A of the first second line segment 252A and a width H7 of the second touch sub-line 23A2 is less than or equal to 40% of the width H7 of the second touch sub-line 23A2.

In some examples, the width H7 of the second touch sub-line 23A2 may be greater than, equal to or less than the width H2 of each shielding sub-line 2521A of the first second line segment 252A.

A difference between the width H7 of the second touch sub-line 23A2 and the width H2 of each shielding sub-line 2521A of the first second line segment 252A is less than or equal to 0.4 times the width H7, which may avoid a poor uniformity of etching caused by a large difference (e.g., greater than 0.4 times the width H7) between the width H7 of the second touch sub-line 23A2 and the width H2 of each shielding sub-line 2521A of the first second line segment 252A.

In some examples, the difference between the width of each shielding sub-line 2521A of the first second line segment 252A and the width of the second touch sub-line 23A2 is less than or equal to 20% of the width H7 of the second touch sub-line 23A2. For example, the width H7 of the second touch sub-line 23A2 is equal to the width H2 of each shielding sub-line 2521A of the first second line segment 252A.

In some examples, the width H7 of the second touch sub-line 23A2 may be in a range from 17 μm to 23 μm, inclusive (17 μm≤H7≤23 μm). For example, the width H7 is equal to 20 μm (H7=20 μm).

In some examples, the width H2 of each shielding sub-line 2521A of the first second line segment 252A may be in a range from 17 μm to 23 μm, inclusive (17 μm≤H2≤23 μm). For example, the width H2 is equal to 20 μm (H2=20 μm).

In some embodiments, referring to FIG. 5, a difference between the width of each shielding sub-line 2521A of the first second line segment 252A and a width H8 of the fourth touch sub-line 244 is less than or equal to 40% of the width of the fourth touch sub-line 244.

In some examples, the width H8 of the fourth touch sub-line 244 may be greater than, equal to or less than the width H2 of each shielding sub-line 2521A of the first second line segment 252A.

A difference between the width H8 of the fourth touch sub-line 244 and the width H2 of each shielding sub-line 2521A of the first second line segment 252A is less than or equal to 0.4 times the width H8, which may avoid a poor uniformity of etching caused by a large difference (e.g., greater than 0.4 times the width H8) between the width H8 of the fourth touch sub-line 244 and the width H2 of each shielding sub-line 2521A of the first second line segment 252A.

In some examples, the difference between the width of each shielding sub-line 2521A of the first second line segment 252A and the width of the fourth touch sub-line 244 is less than or equal to 20% of the width H8 of the fourth touch sub-line 244. For example, the width H8 of the fourth touch sub-line 244 is equal to the width H2 of each shielding sub-line 2521A of the first second line segment 252A.

In some examples, the width H8 of the fourth touch sub-line 244 may be in a range from 17 μm to 23 μm, inclusive (17 μm≤H8≤23 μm). For example, the width H8 is equal to 20 μm (H8=20 μm).

In some embodiments, the width H7 of the second touch sub-line 23A2, the width H2 of each shielding sub-line 2521A of the first second line segment 252A and the width H8 of the fourth touch sub-line 244 are equal to one another (H7=H2=H8).

In some examples, a distance between the first first line segment 251A and a first touch sub-line 23A1 that is adjacent to the first first line segment 251A, a distance between the first first line segment 251A and a third touch sub-line 243 that is adjacent to the first first line segment 251A, a distance between two adjacent first touch sub-lines 23A1 and a distance between two adjacent third touch sub-lines 243 are equal to one another.

In some examples, the distance between the first first line segment 251A and the first touch sub-line 23A1 that is adjacent to the first first line segment 251A is greater than or equal to 5 μm, and is less than or equal to 7 μm. For example, the distance between the first first line segment 251A and the first touch sub-line 23A1 that is adjacent to the first first line segment 251A is equal to 6 μm.

In some embodiments, referring to FIG. 4, the first fan-out region B10 is further provided with a plurality of dummy lines 29 therein. In the first fan-out region B10, the plurality of dummy lines 29 are respectively disposed on a side of the first touch lines 23 away from the shielding line 25 and a side of the second touch lines 24 away from the shielding line 25. The provision of dummy lines 29 may improve the uniformity of etching the first touch lines 23 and the second touch lines 24.

Portions of the shielding line 25, the first touch lines 23 and the second touch lines 24 that are located in the first fan-out region B10 are described above, and portions of the shielding line 25, the first touch line 23 and the second touch line 24 that are located in the lead-out region B30 will be described below.

In some embodiments, referring to FIG. 3, the peripheral region BB includes the first fan-out region B10 connected to the first edge A1 of the touch region AA, the bending region B20 located on the side of the first fan-out region B10 away from the touch region AA, and the lead-out region B30 located on a side of the bending region B20 away from the first fan-out region B10.

Referring to FIGS. 6A and 6B, the lead-out region B30 is provided with a second second line segment 252B therein, and each shielding sub-line 2521B of the second second line segment 252B extends towards the direction far away from the touch region AA.

An extending direction of each shielding sub-line 2521B of the second second line segment 252B may be the same as the first designated direction F1. Alternatively, there may be a designated included angle between the extending direction of each shielding sub-line 2521B of the second second line segment 252B and the first designated direction F1.

In some examples, referring to FIGS. 6A and 6B, an end, proximate to the touch region AA, of each shielding sub-line 2521B of the second second line segment 252B is electrically connected to an end, away from the touch region AA, of the respective shielding sub-line 2521A of the first second line segment 252A. All the shielding sub-line 2521A of the first second line segment 252A is not shown in FIGS. 6A and 6B and may be as shown in FIG. 4.

In some examples, referring to FIGS. 6A and 6B, the number of the shielding sub-lines 2521B is equal to the number of the shielding sub-lines 2521A, and thus the shielding sub-lines 2521B are electrically connected to the shielding sub-lines 2521A in one-to-one correspondence. The shielding sub-lines 2521A are not shown in FIGS. 6A and 6B and may be as shown in FIG. 4.

In some embodiments, referring to FIGS. 6A and 6B, at least portion of the second second line segment 252B progressively approaches a central axis CA of the touch region AA from an end proximate to the touch region AA to another end away from the touch region AA. A direction from the end proximate to the touch region AA to the end away from the touch region AA is the first designated direction F1. That is, the at least portion of the second second line segment 252B is progressively approaches the central axis CA of the touch region AA in the first designated direction F1.

In some examples, the central axis CA of the touch region AA extends in the first direction Y, and the central axis CA of the touch region AA is a center line of the touch region AA in the second direction X. The touch region AA is substantially symmetric with respect to the central axis CA (as shown in FIG. 2B) serving as a symmetric line.

In some examples, the touch layer group 200 is divided, by the central axis CA of the touch region AA, into two parts that are respectively a first part and a second part; the third edge A3 of the touch region AA is located in the first part, and the fourth edge A4 of the touch region AA is located in the second part.

The part of first touch lines 23A, the another part of first touch lines 23B and the second touch lines 24 are gathered in the first part. A plurality of pins in the bonding region B40 are disposed in the middle of the bonding region B40, and the central axis CA passes through the middle of the bonding region B40.

Referring to FIGS. 6A and 6B, a portion of the second second line segment 252B that progressively approaches the central axis CA in the first designated direction F1 is defined as a first line sub-segment 252B1.

In the embodiments of the present disclosure, the first line sub-segment 252B1 gradually approaches the central axis CA of the touch region AA in the first designated direction F1, so that the first line sub-segment 252B1 gradually approaches the ground pins 26 in the bonding region B40.

In some examples, referring to FIGS. 6A and 6B, the part of first touch lines 23A further each include a fifth touch sub-line 23A5, and an extending direction of the fifth touch sub-line 23A5 is the same as an extending direction of the first line sub-segment 252B1.

In some examples, referring to FIGS. 6A and 6B, the second touch line 24 further includes a sixth touch sub-line 246, and an extending direction of the sixth touch sub-line 246 is the same as the extending direction of the first sub-line segment 252B1.

In some examples, referring to FIG. 3, the lead-out region B30 includes a first wiring region B31, and the first wiring region B31 progressively approaches the central axis CA (as shown in FIG. 2B) of the touch region AA in the first designated direction F1. An extending direction of the first wiring region B31 is the same as the extending direction of the first sub-line segment 252B1. The first wiring region B31 extends in a third designated direction F3, and the direction indicated by the arrow F3 is the third designated direction.

The fifth touch sub-line 23A5, the first line sub-segment 252B1 and the sixth touch sub-line 246 are all located in the first wiring region B31. The fifth touch sub-line 23A5, the first line sub-segment 252B1 and the sixth touch sub-line 246 are not shown in FIG. 3 and may be as shown in FIGS. 6A and 6B.

In some examples, in the first wiring region B31, any two adjacent lines have an equal distance therebetween, and a width of each line is equal. It will be noted that the lines in the first wiring region B31 include the fifth touch sub-line 23A5, the sixth touch sub-line 246, shielding sub-lines 2521B1 of the first line sub-segment 252B1, and portions of the another part of first touch lines 23B located in the first wiring region B31.

In some embodiments, referring to FIGS. 6A and 6B, the second second line segment 252B further includes a second line sub-segment 252B2. Shielding sub-lines 2521B2 of the second line sub-segment 252B2 each extend towards the direction far away from the touch region AA; ends, away from the touch region AA, of the shielding sub-lines 2521B2 of the second line sub-segment 252B2 are electrically connected to ends, proximate to the touch region AA, of the shielding sub-lines 2521B1 of the first line sub-segment 252B1 in one-to-one correspondence.

In some examples, referring to FIGS. 6A and 6B, the second line sub-segment 252B2 substantially extends in the first designated direction F1.

In some examples, an extending direction of the second line sub-segment 252B2 is the same as an extending direction of the first second line segment 252A.

In some examples, a width of a region where the second line sub-segment 252B2 is located is equal to the width of the region where the first second line segment 252A is located.

In some examples, a width of the shielding sub-line 2521B2 is equal to the width of the shielding sub-line 2521A.

In some examples, a distance between two adjacent shielding sub-lines 2521B2 is equal to a distance between two adjacent shielding sub-lines 2521A.

In some examples, referring to FIG. 3, the lead-out region B30 further includes a second wiring region B32, the second wiring region B32 extends in the first designated direction F1, and an end of the second wiring region B32 away from the touch region AA is connected to an end of the first wiring region B31 proximate to the touch region AA.

In some examples, in the second wiring region B32, any two adjacent lines have an equal distance therebetween, and a width of each line is equal. It will be noted that the lines in the second wiring region B32 include portions of the first touch lines 23 located in the second wiring region B32, portions of the second touch lines 24 located in the second wiring region B32, and the shielding sub-lines 2521B2 of the second line sub-segment 252B2.

In some embodiments, referring to FIGS. 6A, 6B, 7A and 7B, the lead-out region B30 is further provided with a third second line segment 252C therein, and the third second line segment 252C substantially extends in the direction parallel to the first edge A1. Ends of shielding sub-lines 2521C of the third second line segment 252C are respectively connected to ends, away from the touch region AA, of the shielding sub-lines 2521B1 of the first line sub-segment 252B1. The direction parallel to the first edge A1 is the second direction X.

A description "the third second line segment 252C substantially extends in the direction parallel to the first edge A1" refers to that an included angle between an extending direction of the third second line segment 252C and an extending direction of the first edge A1 is less than 5°.

The number of the shielding sub-lines 2521C of the third second line segment 252C is equal to the number of the shielding sub-lines 2521B1 of the first line sub-segment 252B1. The shielding sub-lines 2521C are electrically connected to the shielding sub-lines 2521B1 in one-to-one correspondence.

In the embodiments of the present disclosure, the third second line segment 252C is disposed in the lead-out region B30. In this way, it is possible to not only cause the shielding line 25 to extend toward the ground pins 26, but also reduce a dimension of the lead-out region B30 in the first direction Y.

In some examples, referring to FIGS. 6A and 6B, the part of first touch lines 23A each further include a seventh touch sub-line 23A7, and an extending direction of the seventh touch sub-line 23A7 is the same as the extending direction of the third second line segment 252C. An end of the seventh touch sub-line 23A7 away from the central axis is electrically connected to an end of the fifth touch sub-line 23A5 away from the touch region AA.

In some examples, a width of the seventh touch sub-line 23A7 is equal to a width of the fifth touch sub-line 23A5.

In some examples, referring to FIGS. 6A and 6B, the second touch line 24 further includes an eighth touch sub-line 248, and an extending direction of the eighth touch sub-line 248 is the same as the extending direction of the third second line segment 252C. An end of the eighth touch sub-line 248 away from the central axis is electrically connected to an end of the sixth touch sub-line 246 away from the touch region AA.

In some examples, a width of the eighth touch sub-line 248 is equal to a width of the sixth touch sub-line 246.

In some examples, referring to FIG. 3, the lead-out region B30 further includes a third wiring region B33, and the third wiring region B33 substantially extends in the direction parallel to the first edge A1. The third wiring region B33 is connected to an end of the first wiring region B31 away from the touch region AA.

The seventh touch sub-line 23A7, the third second line segment 252C and the eighth touch sub-line 248 are all located in the third wiring region B33. The seventh touch sub-line 23A7, the third second line segment 252C and the eighth touch sub-line 248 are not shown in FIG. 3 and may be as shown in FIGS. 6A and 6B.

In some examples, in the third wiring region B33, any two adjacent lines have an equal distance therebetween, and a width of each line is equal. It will be noted that the lines in the third wiring region B33 include the seventh touch sub-line 23A7, the eighth touch sub-line 248, the shielding sub-lines 2521C of the third second line segment 252C, and portions of the another part of first touch lines 23B located in the third wiring region B33.

In some examples, a width of a region where the first sub-line segment 252B1 is located is equal to a width of a region where the third second line segment 252C is located.

In some embodiments, referring to FIG. 6A, the touch layer group further has the bonding region B40 located on a side of the lead-out region B30 away from the bending region B20. The bonding region B40 is provided with ground pins 26 therein.

Figure 7A:
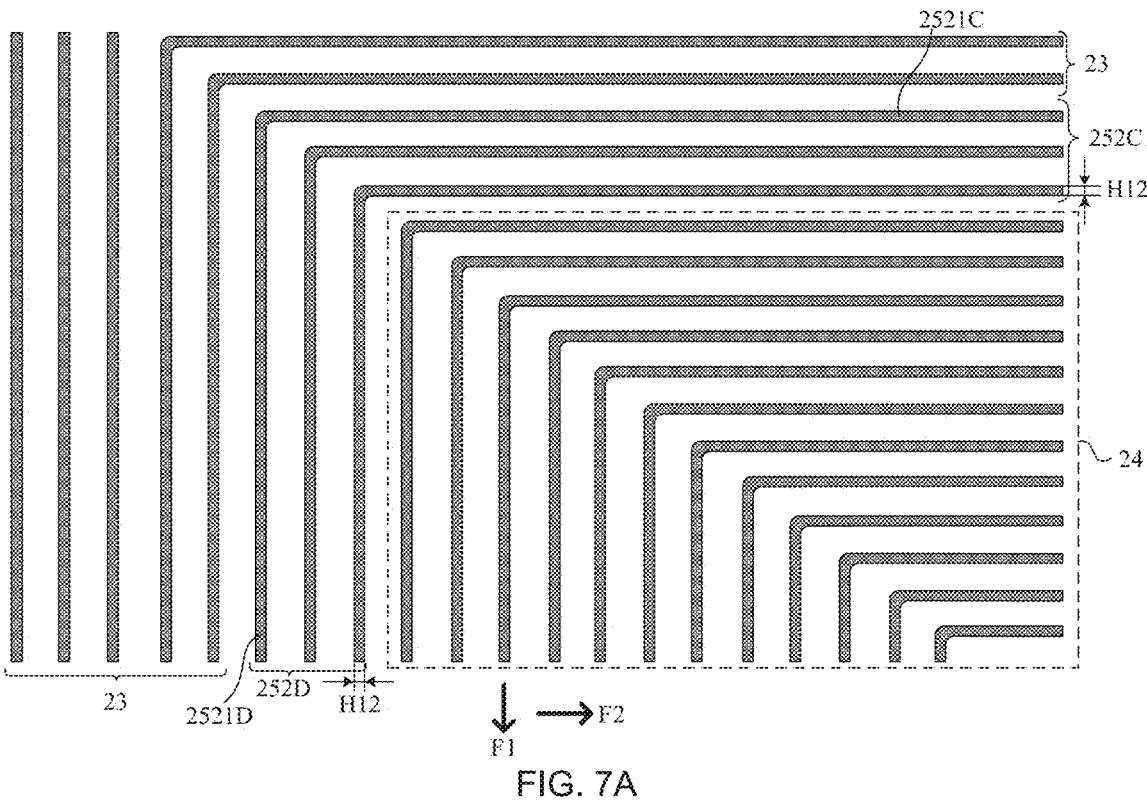
FIG. 7A is a structural diagram of yet another touch layer group, in accordance with some embodiments.
Figure 7B:
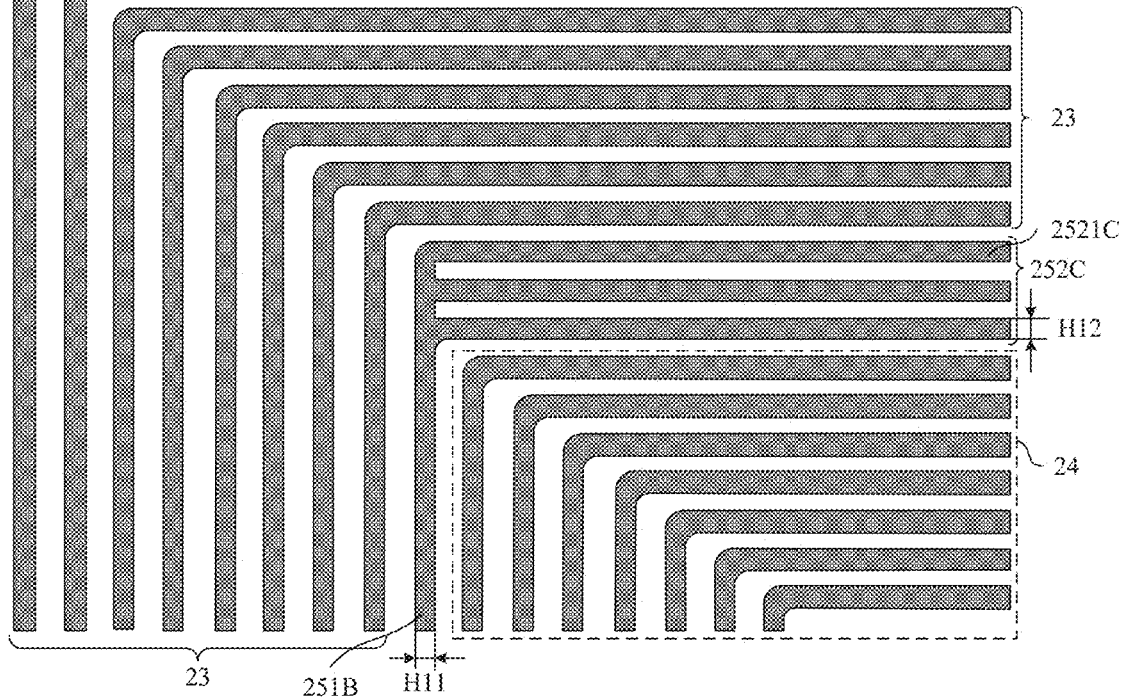
FIG. 7B is a structural diagram of yet another touch layer group, in accordance with some embodiments.

Referring to FIGS. 6A and 7A, the lead-out region B30 is further provided with a fourth second line segment 252D, and the fourth second line segment 252D extends towards the direction far away from the touch region AA. The first designated direction F1 is the direction far away from the touch region AA. In some examples, the fourth second line segment 252D may extend in the first designated direction F1.

Referring to FIGS. 6A and 7A, ends, away from the touch region AA, of shielding sub-lines 2521D of the fourth second line segment 252D are respectively connected to the ground pins 26, and other ends, proximate to the touch region AA, of the shielding sub-lines 2521D of the fourth second line segment 252D are respectively connected to other ends of the shielding sub-lines 2521C of the third second line segment 252C.

In some examples, the shielding sub-lines 2521D of the fourth second line segment 252D are respectively connected to the ground pins 26.

Referring to FIGS. 6A and 6B, in addition to the ground pins 26, the bonding region B40 is further provided with a plurality of first pins 27 and a plurality of second pins 28 therein.

In some examples, a width of a region where the fourth second line segment 252D is located is greater than the width of the region where the third second line segment 252C is located, and the width of the region where the fourth second line segment 252D is located is greater than the width of the region where the first line sub-segment 252B1 is located.

In some examples, a width of each shielding sub-line 2521D of the fourth second line segment 252D is equal to a width of each shielding sub-line 2521C of the third second line segment 252C.

In some examples, referring to FIG. 6A, the part of first touch lines 23A each further include a ninth touch sub-line 23A9, and an extending direction of the ninth touch sub-line 23A9 is the same as an extending direction of the fourth second line segment 252D. An end of the ninth touch sub-line 23A9 proximate to the touch region AA is electrically connected to the other end of the seventh touch sub-line 23A7 away from the fifth touch sub-line 23A5, and the other end of the ninth touch sub-line 23A9 away from the touch region AA is electrically connected to a first pin 27.

In some examples, referring to FIG. 6A, the second touch line 24 further includes a tenth touch sub-line 2410, and an extending direction of the tenth touch sub-line 2410 is the same as the extending direction of the fourth second line segment 252D. An end of the tenth touch sub-line 2410 proximate to the touch region AA is electrically connected to the other end of the eighth touch sub-line 248 away from the sixth touch sub-line 246, and the other end of the tenth touch sub-line 2410 away from the touch region AA is electrically connected to a second pin 28.

In some examples, referring to FIG. 3, the lead-out region B30 further includes a fourth wiring region B34, and the fourth wiring region B34 extends towards the direction away from the touch region AA. In some examples, the fourth wiring region B34 may extend in the first designated direction F1.

The ninth touch sub-line 23A9, the fourth second line segment 252D and the tenth touch sub-line 2410 are all located in the fourth wiring region B34. The ninth touch sub-line 23A9, the fourth second line segment 252D and the tenth touch sub-line 2410 are not shown in FIG. 3 and may be as shown in FIG. 6A.

In some examples, a width of the ninth touch sub-line 23A9 is equal to the width of the seventh touch sub-line 23A7.

In some examples, a width of the tenth touch sub-line 2410 is equal to the width of the eighth touch sub-line 248.

In some examples, in the fourth wiring region B34, any two adjacent lines have an equal distance therebetween, and a width of each line is equal. It will be noted that the lines in the fourth wiring region B34 include the ninth touch sub-line 23A9, the tenth touch sub-line 2410, the shielding sub-lines 2521D of the fourth second line segment 252D, and portions of the another part of first touch lines 23B located in the fourth wiring region B34.

In some embodiments, referring to FIG. 6A, a distance H9 between two adjacent shielding sub-lines 2521D of the fourth second line segment 252D is greater than a distance H10 between two adjacent shielding sub-lines 2521C of the third second line segment 252C.

In a case where the shielding line 25 is electrically connected to the ground pins 26 in the bonding region B40 via the fourth second line segment 252D, the bonding region B40 is provided with the ground pins 26 therein.

In the embodiments of the present disclosure, the distance between two adjacent shielding sub-lines 2521D of the fourth second line segment 252D is greater than the distance between two adjacent shielding sub-lines 2521C of the third second line segment 252C, so that the distance between the ground pins 26 in the bonding region B40 is relatively large caused by the fact that the distance between two adjacent shielding sub-lines 2521D of the fourth second line segment 252D is designed to be relatively large. As a result, it may be possible to avoid coupling among the ground pins 26 in the bonding region B40 caused by a fact that the ground pins 26 are too compact.

In some examples, a distance between two adjacent ninth touch sub-lines 23A9 is greater than a distance between two adjacent seventh touch sub-lines 23A7, so that it may be possible to design a distance between two adjacent first pins 27 to be large, so as to avoid the coupling among the plurality of first pins 27 in the bonding region B40 caused by a fact that the plurality of first pins 27 are too compact.

In some examples, a distance between two adjacent tenth touch sub-lines 2410 is greater than a distance between two adjacent eighth touch sub-lines 248, so that it may be possible to design a distance between two adjacent second pins 28 to be large, so as to avoid the coupling among the plurality of second pins 28 in the bonding region B40 caused by a fact that the plurality of second pins 28 are too compact.

In some examples, referring to FIG. 6A, the distance between two adjacent shielding sub-lines 2521D of the fourth second line segment 252D is represented as H9, and the distance between two adjacent shielding sub-lines 2521C of the third second line segment 252C is represented as H10; the distance H9 is greater than the distance H10, and is less than or equal to 2 times the distance H10 ($H10 < H9 \leq 2H10$). For example, the distance H9 is equal to 1.53 times the distance H10 ($H9 = 1.53H10$).

In some examples, the distance H9 is in a range from 20 μm to 26 μm, inclusive ($20\ \mu m \leq H9 \leq 26\ \mu m$). For example, the distance H9 is equal to 23 μm ($H9 = 23\ \mu m$).

In some examples, the distance H10 is in a range from 12 μm to 18 μm, inclusive ($12\ \mu m \leq H10 \leq 18\ \mu m$). For example, the distance H10 is equal to 15 μm ($H10 = 15\ \mu m$).

In some examples, referring to FIG. 6A, a distance between the ninth touch sub-line 23A9 and a shielding sub-line 2521D adjacent thereto is greater than a distance between the seventh touch sub-line 23A7 and a shielding sub-line 2521C adjacent thereto.

In some examples, referring to FIG. 6A, a distance between the tenth touch sub-line 2410 and a shielding sub-line 2521D adjacent thereto is greater than a distance between the eighth touch sub-line 248 and a shielding sub-line 2521C adjacent thereto.

In some examples, referring to FIG. 6A, the width of the region where the second line sub-segment 252B2 is located is equal to the width of the region where the fourth second line segment 252D is located.

In some examples, the width of the shielding sub-line 2521B2 is equal to the width of the shielding sub-line 2521D.

In some examples, the distance between two adjacent shielding sub-lines 2521B2 is equal to the distance between two adjacent shielding sub-lines 2521D.

In some of the above embodiments, the shielding line 25 is electrically connected to the ground pins 26 via the second line segment 252. In some other embodiments, referring to FIGS. 6B and 7B, the lead-out region B30 is further provided with a second first line segment 251B therein, and the second first line segment 251B extends towards the direction far away from the touch region AA. Referring to FIG. 6B, the first designated direction F1 is the direction far away from the touch region AA. In some examples, the second first line segment 251B may extend in the first designated direction F1.

Referring to FIG. 6B, an end of the second first line segment 251B is connected to a ground pin 26, and the other end of the second first line segment 251B is connected to all the shielding sub-lines 2521C of the third second line segment 252C.

The other end of the second first line segment 251B proximate to the touch region AA is electrically connected to all the ends of the shielding sub-lines 2521C away from the shielding sub-lines 2521B1, and the end of the second first line segment 251B away from the touch region AA is electrically connected to the ground pin 26.

The shielding line 25 is electrically connected to the ground pin 26 via the second first line segment 251B, so that the number of ground pins 26 may be reduced.

In a case where the lead-out region B30 is further provided with the second first line segment 251B, referring to FIG. 6B, the extending direction of the ninth touch sub-line 23A9 is the same as an extending direction of the second first line segment 251B, and the extending direction of the tenth touch sub-line 2410 is the same as the extending direction of the second first line segment 251B. In this case, the lines in the fourth wiring region B34 include the ninth touch sub-lines 23A9, the tenth touch sub-lines 2410 and the second first line segment 251B.

In some embodiments, in the lead-out region 30, a difference between a width of the second first line segment 251B and a width of any shielding sub-line 2521 is less than or equal to 40% of the width of the any shielding sub-line 2521.

In the case where the lead-out region B30 is provided with the second first line segment 251B therein, shielding sub-lines 2521 in the lead-out region B30 include the shielding sub-lines 2521C of the third second line segment 252C and the shielding sub-lines 2521B1 of the first line sub-segment 252B1. The width of the shielding sub-line 2521C is equal to widths of the shielding sub-lines 2521B1.

Referring to FIG. 6B, the width of the second first line segment 251B is represented as H11, and the width of the any shielding sub-line 2521 in the lead-out region B30 is represented as H12.

In some examples, the width H11 of the second first line segment 251B may be greater than, equal to or less than the width H12 of each shielding sub-line 2521 in the lead-out region B30.

The difference between the width H11 of the second first line segment 251B and the width H12 of each shielding sub-line 2521 in the lead-out region B30 is less than or equal to 0.4 times the width H12, which may avoid the poor uniformity of etching caused by a fact that a difference between the width of the second first line segment 251B and the width of each of the first touch line 23 and the second touch line 24 is too large due to a large difference (e.g., greater than 0.4 times the width H12) between the width of the second first line segment 251B and the width of each shielding sub-line 2521 in the lead-out region B30.

In some examples, in the lead-out region 30, the difference between the width of the second first line segment 251B and the width of the any shielding sub-line 2521 is less than or equal to 20% of the width of the any shielding sub-line 2521. For example, in the lead-out region B30, the width H11 of the second first line segment 251B is equal to the width H12 of the any shielding sub-line 2521.

In some examples, the width H11 of the second first line segment 251B is in a range from 12 μm to 16 μm, inclusive (12 μm≤H11≤16 μm). For example, the width H11 is equal to 14 μm (H11=14 μm).

In some examples, the width H12 of the any shielding sub-line 2521 in the lead-out region B30 is in a range from 12 μm to 16 μm, inclusive (12 μm≤H12≤16 μm). For example, the width H12 is equal to 14 μm (H12=14 μm).

In some embodiments, in the lead-out region B30, a difference between the width of the any shielding sub-line 2521 and the width of the first touch line 23 is less than or equal to 40% of the width of the first touch line 23.

In some examples, referring to FIG. 6A, portions of the shielding sub-lines 2521 located in the lead-out region B30 include the shielding sub-lines 2521B1 of the first line sub-segment 252B1, the shielding sub-lines 2521C of the third second line segment 252C and the shielding sub-lines 2521D of the fourth second line segment 252D.

In some other examples, referring to FIG. 6B, the portions of the shielding sub-lines 2521 located in the lead-out region B30 include the shielding sub-lines 2521B1 of the first line sub-segment 252B1 and the shielding sub-lines 2521C of the third second line segment 252C.

In some examples, widths of portions, located in the lead-out region B30, of the plurality of first touch lines 23 are equal. Referring to FIGS. 6A and 6B, the width of the portion, located in the lead-out region B30, of the first touch line 23 is represented as H13.

In some examples, the width H13 of the portion, located in the lead-out region B30, of the first touch line 23 may be greater than, equal to or less than the width H12 of each shielding sub-line 2521 in the lead-out region B30.

A difference between the width H13 of the portion, located in the lead-out region B30, of the first touch line 23 and the width H12 of each shielding sub-line 2521 in the lead-out region B30 is less than or equal to 0.4 times the width H13, which may avoid the poor uniformity of etching due to a large difference (e.g., greater than 0.4 times the width H13) between the width of the portion, located in the lead-out region B30, of the first touch line 23 and the width of each shielding sub-line 2521 in the lead-out region B30.

In some examples, in the lead-out region 30, the difference between the width of the portion, located in the lead-out region B30, of the first touch line 23 and the width of the portion, located in the lead-out region B30, of the any shielding sub-line 2521 is less than or equal to 20% of the width of the portion, located in the lead-out region B30, of the first touch line 23. For example, in the lead-out region B30, the width H13 of the portion, located in the lead-out region B30, of the first touch line 23 is equal to the width H12 of the portion, located in the lead-out region B30, of the any shielding sub-line 2521.

In some examples, the width H13 of the portion, located in the lead-out region B30, of the first touch line 23 is in a range from 12 μm to 16 μm, inclusive (12 μm≤H13≤16 μm). For example, the width H13 is equal to 14 μm (H13=14 μm).

In some embodiments, in the lead-out region B30, a difference between the width of the any shielding sub-line 2521 and the width of the second touch line 24 is less than or equal to 40% of the width of the second touch line 24.

In some examples, widths of portions, located in the lead-out region B30, of the plurality of second touch lines 24 are equal. Referring to FIGS. 6A and 6B, the width of the portion, located in the lead-out region B30, of the second touch line 24 is represented as H14.

In some examples, the width H14 of the portion, located in the lead-out region B30, of the second touch line 24 may be greater than, equal to or less than the width H12 of each shielding sub-line 2521 in the lead-out region B30.

A difference between the width H14 of the portion, located in the lead-out region B30, of the second touch line 24 and the width H12 of each shielding sub-line 2521 in the lead-out region B30 is less than or equal to 0.4 times the width H14, which may avoid the poor uniformity of etching due to a large difference (e.g., greater than 0.4 times the width H14) between the width of the portion, located in the lead-out region B30, of the second touch line 24 and the width of each shielding sub-line 2521 in the lead-out region B30.

In some examples, in the lead-out region 30, the difference between the width of the portion, located in the lead-out region B30, of the second touch line 24 and the width of the portion, located in the lead-out region B30, of the any shielding sub-line 2521 is less than or equal to 20% of the width of the portion, located in the lead-out region B30, of the second touch line 24. For example, in the lead-out region B30, the width H14 of the portion, located in the lead-out region B30, of the second touch line 24 is equal to the width H12 of the portion, located in the lead-out region B30, of the any shielding sub-line 2521.

In some examples, the width H14 of the portion, located in the lead-out region B30, of the second touch line 24 is in a range from 12 μm to 16 μm, inclusive (12 μm≤H14≤16 μm). For example, the width H14 is equal to 14 μm (H14=14 μm).

In some embodiments, in the lead-out region B30, the width of the first touch line 23, the width of the second touch line 24 and the width of the shielding sub-line 2521 are equal (H13=H14=H12).

In some examples, in the lead-out region B30, a difference between the width H11 of the second first line segment 251B and the width of the first touch line 23 is less than or equal to 40% of the width H13 of the first touch line 23. For example, the difference between the width H11 of the second first line segment 251B and the width of the first touch line 23 is less than or equal to 20% of the width H13 of the first touch line 23. For example, the width H11 is equal to the width H13 (H11=H13).

In some examples, in the lead-out region B30, a difference between the width H11 of the second first line segment 251B and the width of the second touch line 24 is less than or equal to 40% of the width H14 of the second touch line 24. For example, the difference between the width H11 of the second first line segment 251B and the width of the second touch line 24 is less than or equal to 20% of the width H14 of the second touch line 24. For example, the width H11 is equal to the width H14 (H11=H14).

In some examples, the width H11, the width H13 and the width H14 are equal (H11=H13=H14).

In some embodiments, a width of a region where all shielding sub-lines 2521 of a second line segment 252 are located is 3 to 8 times the width of the first line segment 251. In this way, it is possible to avoid a large width of a region where the second line segment 252 is located caused by a large difference (e.g., greater than 8 times the width of the first line segment 251) between the width of the region where all the shielding sub-lines 2521 of the second line segment 252 are located and the width of the first line segment 251. In addition, it is possible to avoid the reduction of the shielding effect caused by a fact that the width of the first line segment 251 is too small due to a small difference (e.g., less than 3 times the width of the first line segment 251) between the width of the region where all the shielding sub-lines 2521 of the second line segment are located and the width of the first line segment 251.

In some of the above embodiments, the ratio of the width H3 of the region where the first second line segment 252A in the first fan-out region B10 is located to the width H1 of the first first line segment 251A in the first fan-out region B10 is described above, and a ratio of the width of the second line segment 252 in the lead-out region B30 to the width of the first line segment 251 in the lead-out region B30 will be described below.

In some examples, the lead-out region B30 is provided therein with the first line sub-segment 252B1 and the third second line segment 252C. The width of the shielding sub-line 2521B1 of the first line sub-segment 252B1 is equal to the width of the shielding sub-line 2521C of the third second line segment 252C, and a distance between two adjacent shielding sub-lines 2521B1 is equal to the distance between two adjacent shielding sub-lines 2521C. In this case, the width of the region where the first line sub-segment 252B1 is located is equal to the width of the region where the third second line segment 252C is located.

Referring to FIGS. 6A and 6B, the width of the region where the first line sub-segment 252B1 is located is represented as H15.

Referring to FIG. 6B, in the case where the lead-out region B30 is further provided with the second first line segment 251B therein, the width H15 of the first line sub-segment 252B1 is 4.5 to 6 times the width H11 of the second first line segment 251B. In some examples, the width H15 is 4.8 to 5.4 times the width H11. For example, the width H15 is 5.14 times the width H11.

In some examples, the width H15 of the region where the first line sub-segment 252B1 is located is in a range from 68 μm to 76 μm, inclusive (68 μm≤H15≤76 μm). For example, the width H15 is equal to 72 μm (H15=72 μm).

In some examples, the width H3 of the region where the first second line segment 252A is located is 6 to 8 times the width H11 of the second first line segment 251B. For example, the width H3 is equal to 7.57 times the width H11 (H3=7.57H11).

Figure 7C:
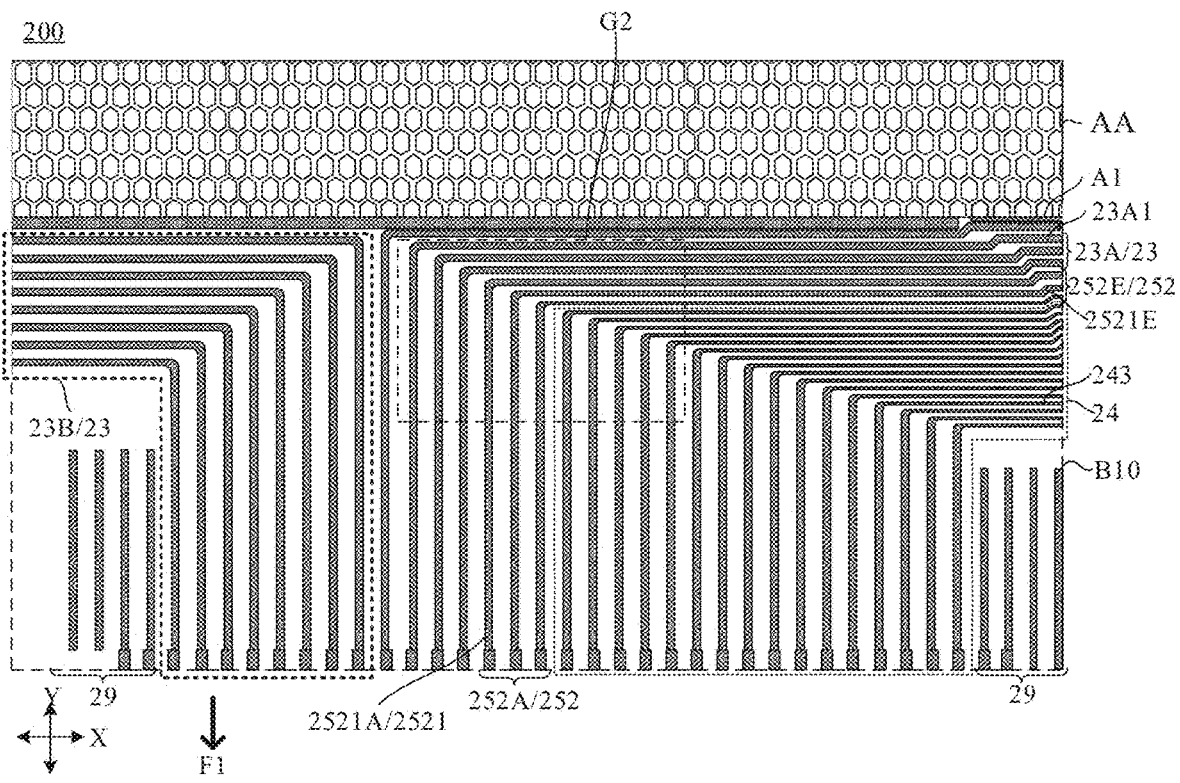
FIG. 7C is a structural diagram of yet another touch layer group, in accordance with some embodiments.
Figure 7D:
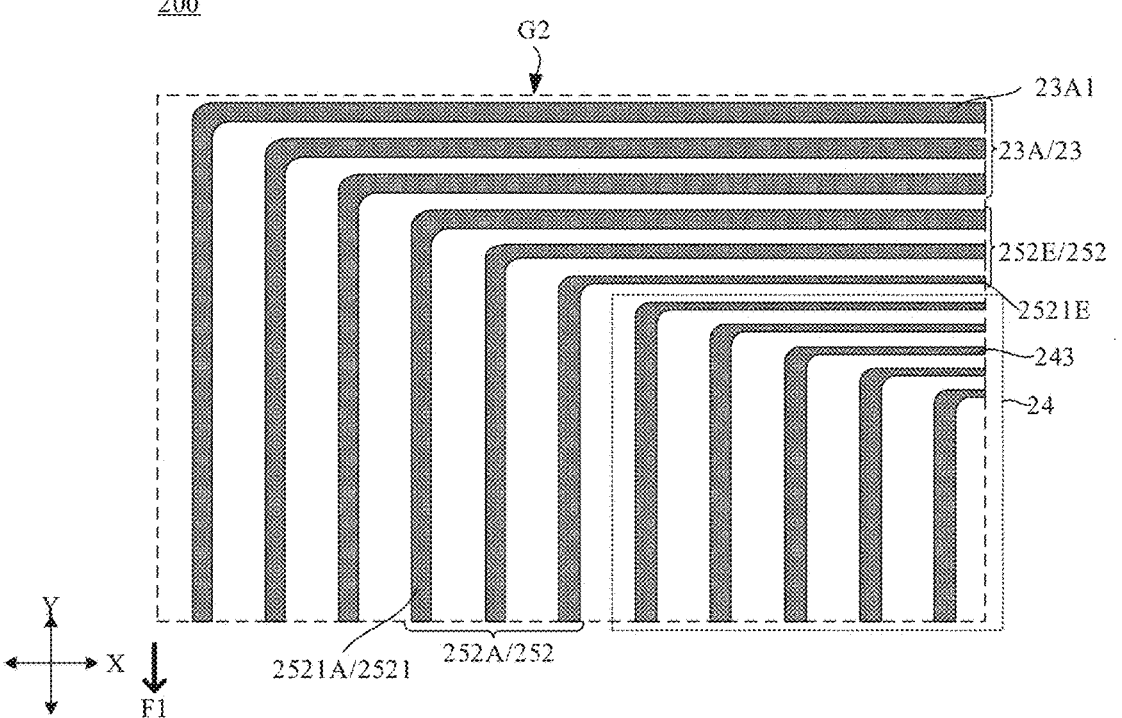
FIG. 7D is a partial enlargement view of the G2 region in FIG. 7C.

In some embodiments, in the case where the lead-out region B30 is further provided with the second first line segment 251B therein, referring to FIGS. 7C and 7D, the first fan-out region B10 is further provided with a fifth second line segment 252E therein, and the fifth second line segment 252E extends along the first edge A1 of the touch region AA. Shielding sub-lines 2521E of the fifth second line segment 252E each extend along the first edge A1. The first touch sub-line 23A1 and the third touch sub-line 243 are respectively disposed on two sides of the fifth second line segment 252E.

Ends of the shielding sub-lines 2521E of the fifth second line segment 252E are electrically connected to the ends, proximate to the touch region AA, of the shielding sub-lines 2521A of the first second line segment 252A in one-to-one correspondence.

In some examples, referring to FIG. 7C, in the first designated direction F1, widths of the shielding sub-lines 2521E of the fifth second line segment 252E gradually decrease.

In some examples, in the fifth second line segment 252E, a width of a shielding sub-line 2521E proximate to the first touch sub-line 23A1 is equal to the width of the first touch sub-line 23A1, so that a first touch line 23 proximate to the shielding sub-line 2521E and a first touch line 23 away from the shielding sub-line 2521E have a same signal environment, so as to improve the touch performance of the touch layer group 200.

In some examples, in the fifth second line segment 252E, a width of a shielding sub-line 2521 proximate to the third touch sub-line 243 is equal to the width of the third touch sub-line 243, so that a second touch line 24 proximate to the shielding sub-line 2521 and a second touch line 24 away from the shielding sub-line 2521 have a same signal environment, so as to improve the touch performance of the touch layer group 200 is improved.

In some embodiments, referring to FIGS. 6A and 6B, there are 2 to 4 shielding sub-lines 2521 in the second line segment 252. For example, there are 3 shielding sub-lines 2521 in the second line segment 252.

Structures, in each region, of the first touch line 23, the second touch line 24 and the shielding line 25 are described above, and the first touch electrode 21 and the second touch electrode 22 will be described below.

In some embodiments, referring to FIG. 2B, each first touch electrode 21 of the plurality of first touch electrodes 21 is of a one-piece structure; each second touch electrode 22 of the plurality of second touch electrodes 22 includes a plurality of touch sub-electrodes 221 and at least one bridging portion 222; two adjacent touch sub-electrodes 221 of the second touch electrode 22 are spaced apart by a single first touch electrode 21.

Figure 8A:
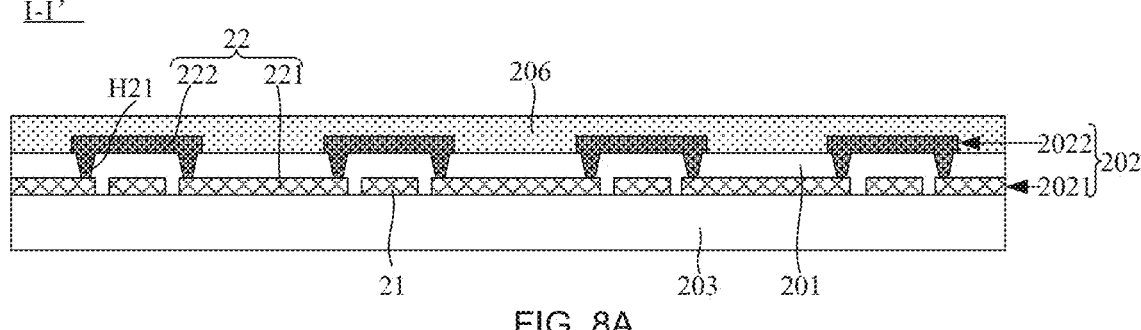
FIG. 8A is a sectional view taken along the I-I' line in FIG. 2B.

Referring to FIG. 8A, the touch layer group 200 includes an insulating layer 201 and two conductive layers 202, and the insulating layer 201 is located between the two conductive layers 202. The plurality of first touch electrodes 21 and the plurality of touch sub-electrodes 221 are located in a conductive layer 202 of the two conductive layers, bridging portions 222 are located in the other conductive layer 202 of the two conductive layers, and a bridging portion 222 is electrically connected to two adjacent touch sub-electrodes 221 through respective via holes H21 in the insulating layer 201.

It will be noted that a description "the first touch electrode 21 is of the one-piece structure" refers to that all portions of each first touch electrode 21 are located in a same layer and directly connected together.

In addition, the phrase "same layer" refers to a layer structure formed through a same patterning process by using a same mask in which a film layer for forming specific patterns is formed by using a same film-forming process. Depending on different specific patterns, the same patterning process may include several exposure, development and etching, the specific patterns formed in the layer structure may be continuous or discontinuous, and these specific patterns may also be at different heights or have different thicknesses.

In the embodiments of the present disclosure, each first touch electrode 21 is of the one-piece structure, and all of the touch sub-electrodes 221 and all of the first touch electrodes 21 are disposed in a same layer. In addition, two adjacent touch sub-electrodes 221, that are spaced apart by the first touch electrode 21, of each second touch electrode 22 are connected to the bridging portion 222 through respective via holes in the insulating layer 201. That is, each bridging portion 222 crosses a first touch electrode 21. In this way, it is possible to achieve the electrical connection between the touch sub-electrodes 221 of each second touch electrode 22.

In some embodiments, as shown in FIG. 8A, two adjacent touch sub-electrodes 221 of the second touch electrode 22 are electrically connected to the bridging portion 222 through at least two via holes H21 in the insulating layer 201.

Since two adjacent touch sub-electrodes 221 spaced apart by the first touch electrode 21 are connected to each other through at least two via holes in the insulating layer 201, the first touch electrode 21 and the bridging portion 222 have an overlapping region therebetween. Moreover, since the first touch electrode 21 and the bridging portion 222 are insulated from each other, a capacitor is created in the overlapping region between the first touch electrode 21 and the bridging portion 222, and the original capacitance in this region will be changed when the conductor (e.g., the finger) touches the overlapping region. Therefore, the position of the touch point is determined by detecting the change in capacitance.

Here, referring to FIG. 8A, in addition to the insulating layer 201 and the two conductive layers 202, the touch layer group 200 further includes a carrier panel 203. The insulating layer 201 and the two conductive layers 202 are all disposed on a side of the carrier panel 203. A description that the first touch electrode 21 and the touch sub-electrode 221 are disposed in the same layer, and the first touch electrode 21 and the bridging portion 222 are respectively located on two sides of the insulating layer 201, may be refers to an arrangement that the first touch electrode 21 and the touch sub-electrode 221 are disposed on a side of the insulating layer 201 proximate to the carrier panel 203, and the bridging portion 222 is disposed on a side of the insulating layer 201 away from the carrier panel 203, or refers to another arrangement that the first touch electrode 21 and the touch sub-electrode 221 are disposed on the side of the insulating layer 201 away from the carrier panel 203, and the bridging portion 222 is disposed on the side of the insulating layer 201 proximate to the carrier panel 203, which is not limited in the embodiments of the present disclosure.

An arrangement of the insulating layer 201 is not limited. The insulating layer 201 may be provided as a whole-layer structure, or there are multiple insulating layers 201. In a case where there are multiple insulating layers 201, an insulating layer 201 is disposed only in the overlapping region between the first touch electrode 21 and the bridging portion 222. In a case where the insulating layer 201 is of the whole-layer structure, for example, referring to FIG. 8A, orthographic projections of the first touch electrode 21 and the touch sub-electrode 221 on the insulating layer 201 are both within an edge of the insulating layer 201.

In a case where the first touch electrode 21 and the touch sub-electrode 221 each have a metal mesh structure, a metal material of the metal mesh is not limited. The metal material may be single metal or metal alloy. For example, the metal material may be one of silver (Ag), copper (Cu), aluminum (Al) or aluminum-niobium (Al—Nb) alloy. Alternatively, the metal mesh structure may be of a metal layer in which a plurality of metal sub-layers (at least two metal sub-layers) are arranged in a stack. For example, the metal layer includes three metal sub-layers in which a material of a metal sub-layer located in the middle is Al, materials of metal sub-layers respectively located on two sides of the middle layer are both titanium (Ti), and this structure may be represented as Ti/Al/Ti. In this case, the conductive layer 202 including the first touch electrode 21 and the touch sub-electrode 221 has a structure of Ti/Al/Ti.

In some examples, referring to FIG. 8A, the two conductive layers 202 are a first conductive layer 2021 and a second conductive layer 2022, respectively. The second conductive layer 2022 is located on a side of the first conductive layer 2021 away from the carrier panel 203. The first touch electrodes 21 and the touch sub-electrodes 221 are located in the first conductive layer 2021, and the bridging portions 222 are located in the second conductive layer 2022. In this case, the first conductive layer 2021 has the structure of Ti/Al/Ti. In this example, in the case where the first touch electrode 21 and the touch sub-electrode 221 each have the metal mesh structure, the touch layer group 200 may have a relatively good light transmittance; furthermore, an overall conductivity of each of the first touch electrode 21 and the second touch electrode 22 that are both made of the metal material is relatively good based on a fact that an electric conductivity of the metal material is generally less than an electric conductivity of a transparent conductive material such as indium tin oxide (ITO).

It will be understood that the first touch electrodes 21 and the touch sub-electrodes 221 are disposed in the same layer, so that a first touch electrode 21 and a touch sub-electrode 221 that are adjacent to each other are disconnected with reference to FIG. 8A.

In addition, shapes of the first touch electrode 21 and the touch sub-electrode 221 that each having the metal mesh structure are not limited. For example, as shown in FIG. 2B, of each first touch electrode 21, except two endmost portions of the first touch electrode 21, the remaining portion of the first touch electrode 21 is constituted by a plurality of rhombuses, and ends of two adjacent rhombuses are directly connected to each other; of each second touch electrode 22, except two endmost touch sub-electrodes 221, the remaining touch sub-electrodes 221 are each a rhombus.

It will be noted that the two endmost portions of the first touch electrode 21 are respectively located on two ends of the first touch electrode 21 in an extending direction of the first touch electrode 21, and respectively located on two edges of the touch region AA. Similarly, the two endmost touch sub-electrodes 221 are respectively located on two ends of the second touch electrodes 22 in an extending direction of the second touch electrodes 22, and respectively located on another two edges of the touch region AA.

On this basis, the remaining portion, except for the two endmost portions, of the first touch electrode 21 are constituted by the plurality of rhombuses directly connected to one another, and the remaining touch sub-electrodes 221, except for two endmost touch sub-electrodes 221, are each the rhombus. Thus, the two endmost portions of the first touch electrode 21 and the two endmost touch sub-electrodes 221 may be each set to be in a shape of an isosceles triangle, and a base of the isosceles triangle faces an edge of the touch region AA of the touch layer group 200, so that the edge of the touch region AA is provided therein with the first touch electrode 21 and the touch sub-electrode 221. As a result, it may be ensured that there is no touch blind region in the edges of the touch region AA.

In some embodiments, the first line segment 251 is of a single-layer line or a double-layer line. In a case where the first line segment 251 is of the single-layer line, the first line segment 251 may be located in any conductive layer 202. In a case where the first line segment 251 is the double-layer line, the first line segment 251 includes a first sub-line and a second sub-line, the first sub-line and the second sub-line are respectively disposed in the two conductive layers 202, the first sub-line at least partially overlaps with the second sub-line, and the first sub-line may be electrically connected to the second sub-line through a via hole located in the insulating layer 201.

In some embodiments, at least one shielding sub-line 2521 of the second line segment 252 is of a single-layer line or a double-layer line.

In a case where the shielding sub-line 2521 is of the single-layer line, the shielding sub-line 2521 may be located in any conductive layer 202. For example, the shielding sub-line 2521 may be disposed in a layer the same as the layer where the first touch electrodes 21 and the touch sub-electrodes 221 are disposed or the layer where the bridging portions 222 are disposed. For example, the single-layer line has the structure of Ti/Al/Ti.

In a case where the shielding sub-line 2521 is of the double-layer line, one layer of the shielding sub-line 2521 is located in the first conductive layer 2021. For example, a portion of the shielding sub-line 2521 located in the first conductive layer 2021 has the structure of Ti/Al/Ti. The other layer of the shielding sub-line 2521 may be disposed in a layer the same as the layer where the bridging portion 222 is disposed (i.e., the second conductive layer 2022). For example, a portion of the shielding sub-line 2521 located in the second conductive layer 2022 also has the structure of Ti/Al/Ti. In this case, of the shielding sub-line 2521, the portion located in the first conductive layer 2021 is electrically connected to the portion located in the second conductive layer 2022 through a via hole in the insulating layer 201.

Figure 11:
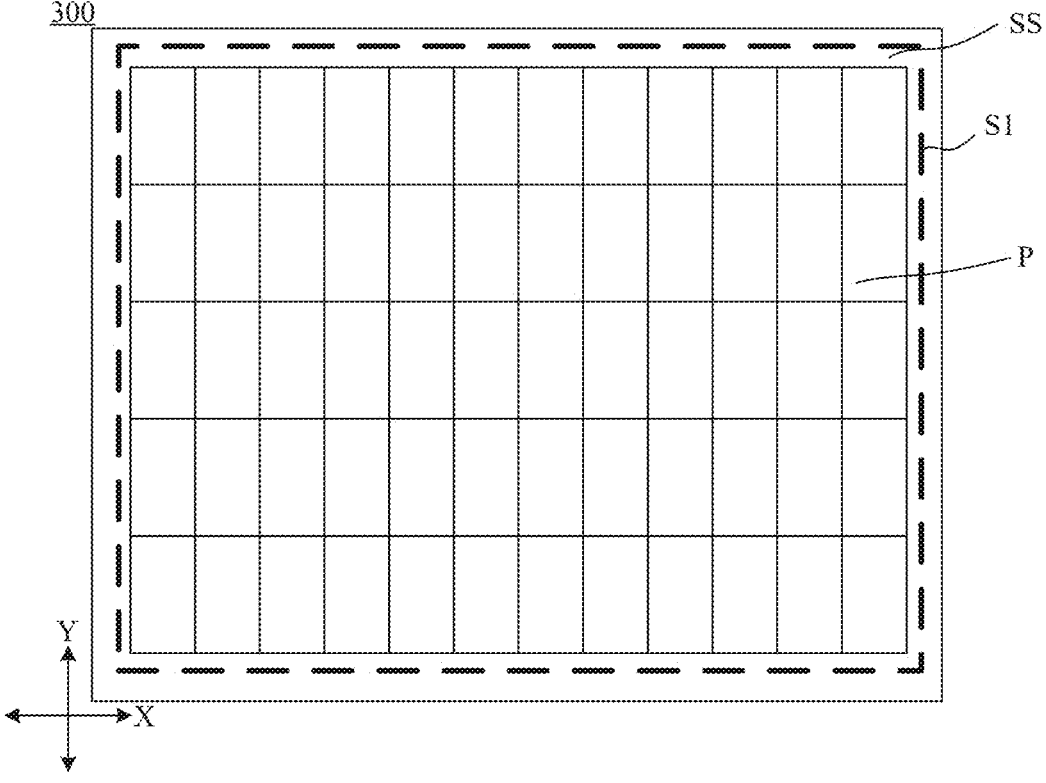
FIG. 11 is a structural diagram of yet another touch display apparatus, in accordance with some embodiments.
Figure 12:
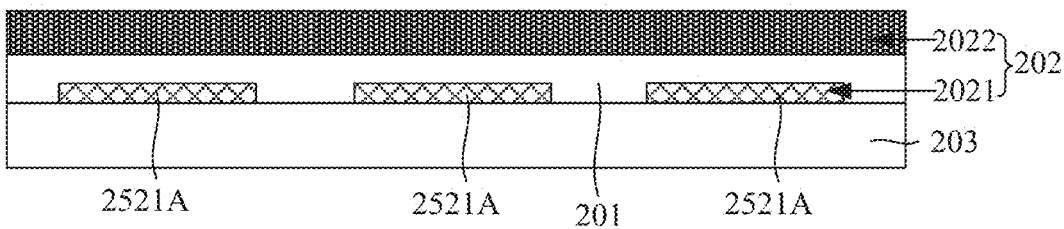
FIG. 12 is a sectional view taken along the M-M' line in FIG. 5.
Figure 13:
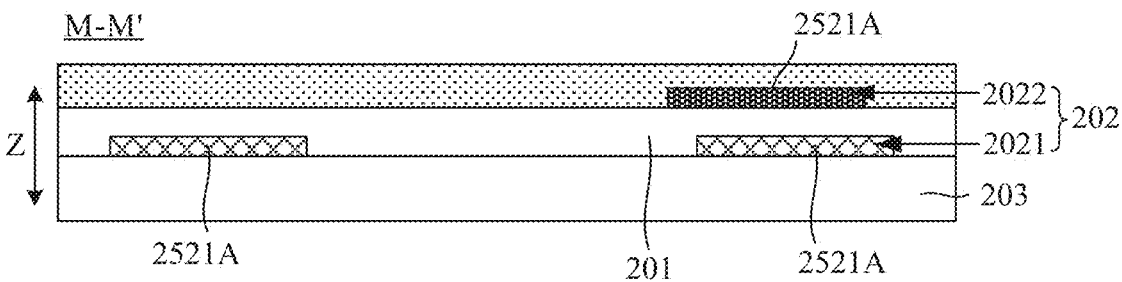
FIG. 13 is another sectional view taken along the M-M' line in FIG. 5.

In a case where the plurality of shielding sub-lines 2521 of the second line segment 252 are each of the single-layer line, the plurality of shielding sub-lines 2521 are located in a same conductive layer 202 (for example, as shown in FIG. 11, the plurality of shielding sub-lines 2521A are located in the first conductive layer 2021); alternatively, the plurality of shielding sub-lines 2521 are located in the two conductive layers 202, and at least one shielding sub-line 2521 located in one of the two conductive layers 202 at least partially overlaps with at least one shielding sub-line 2521 located in the other of the two conductive layers 202 in a direction perpendicular to the touch layer group 200 (for example, as shown in FIG. 12, a shielding sub-lines 2521A located in the second conductive layer 2022 partially overlaps with a shielding sub-lines 2521A located in the first conductive layer 2021 in a direction Z perpendicular to the touch layer group).

In a case where the plurality of shielding sub-lines 2521 are located in the two conductive layers 202, the shielding sub-lines 2521 include first shielding sub-lines and second shielding sub-lines, and at least one first shielding sub-line at least partially overlaps with at least one second shielding sub-line. For example, a first shielding sub-line completely overlaps with a second shielding sub-line, so that the space occupied by the shielding sub-lines may be reduced, and the space occupied by the touch lines may be enlarged. As a result, the width of the touch line may be improved, which reduces a difference between the width of the touch line and the width of the shielding line 25, thereby improving the uniformity of etching.

Figure 8B:
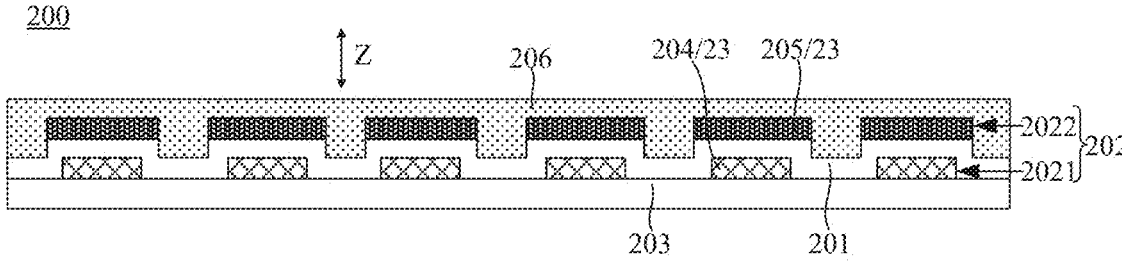
FIG. 8B is a sectional view of a touch layer group, in accordance with some embodiments.

In some embodiments, referring to FIG. 8B, the touch layer group 200 includes a plurality of first-type touch lines 204 and a plurality of second-type touch lines 205. The plurality of first-type touch lines 204 and the plurality of second-type touch lines 205 are respectively disposed in two conductive layers 202. The first-type touch lines 204 and the second-type touch lines 205 are each of a single-layer line.

In some examples, referring to FIG. 8B, the two conductive layers 202 are the first conductive layer 2021 and the second conductive layer 2022, respectively. The first-type touch lines 204 are located in the first conductive layer 2021, and the second-type touch lines 205 are located in the second conductive layer 2022. The second conductive layer 2022 is located on the side of the first conductive layer 2021 away from the carrier panel 203.

A first-type touch line 204 at least partially overlaps with a second-type touch line 205 in the direction Z perpendicular to the touch layer group 200. In this way, an area occupied by both the first-type touch lines 204 and the second-type touch lines 205 may be reduced. In addition, a width of the first-type touch line 204 and a width of the second-type touch line 205 may be both designed to be relatively large, thereby reducing a difference between the width of the shielding line 25 and the width of the first-type touch line 204 and a difference between the width of the shielding line 25 and the width of the second-type touch line 205. As a result, the uniformity of etching is improved.

In some examples, the first-type touch line 204 may completely or partially overlap with the second-type touch line 205.

The plurality of first-type touch lines 204 include a part of the first touch lines 23 and a part of the second touch lines 24, and the plurality of second-type touch lines 205 include another part of the first touch lines 23 and another part of the second touch lines 24.

The plurality of first touch lines 23 are disposed in the two conductive layers 202, and the first touch lines 23 are each of a single-layer line. Therefore, any two first touch lines 23 are respectively connected to different first pins 27.

The plurality of second touch lines 24 are disposed in the two conductive layers 202, and the second touch lines 24 are each of a single-layer line. Therefore, any two second touch lines 24 are respectively connected to different second pins 28.

In some other examples, the first touch lines 23 are each a double-layer line. Of course, referring to FIG. 8C, the second touch lines 24 are each a double-layer line.

Figure 8C:
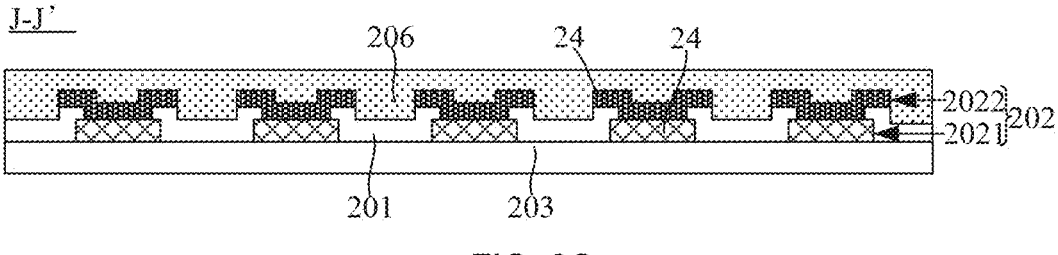
FIG. 8C is another sectional view taken along the J-J' line in FIG. 2B.

In some embodiments, referring to FIG. 8A to FIG. 8C, the touch layer group 200 further includes a protective layer 206; the protective layer 206 is located on a side of the two conductive layers 202 away from the carrier panel 203. In this case, the two conductive layers 202 and the insulating layer 201 are located between the protective layer 206 and the carrier panel 203, and the protective layer 206 may protect the two conductive layers 202, thereby preventing the conductive layer 202 from being scratched and affecting the touch function.

Figure 9:
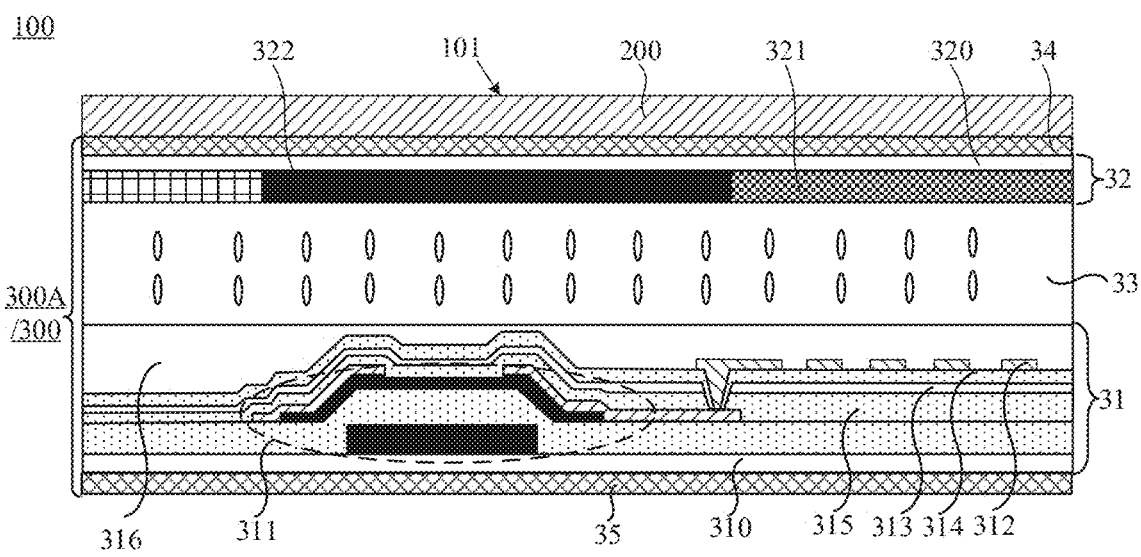
FIG. 9 is a structural diagram of another touch display apparatus, in accordance with some embodiments.
Figure 10:
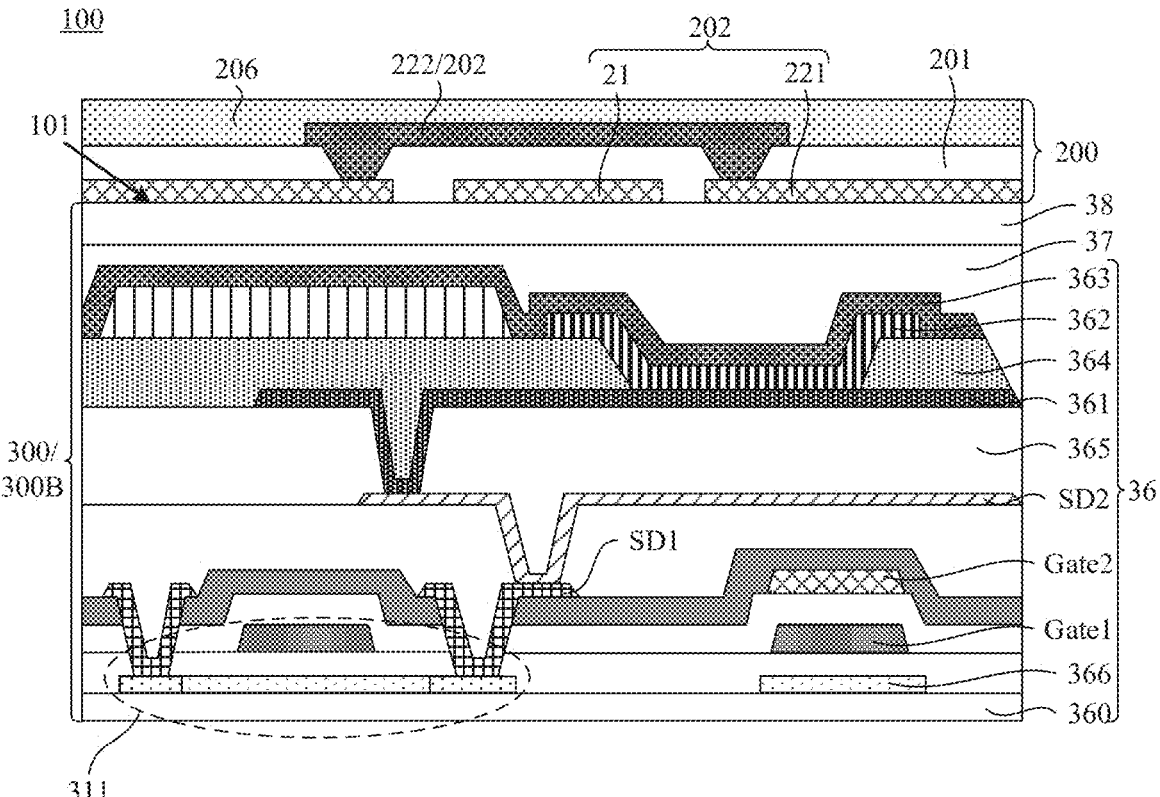
FIG. 10 is a structural diagram of yet another touch display apparatus, in accordance with some embodiments.

In some embodiments, referring to FIGS. 9 and 10, the touch display apparatus 100 further includes a display substrate 300, and the touch layer group 200 is located on a display surface 101 of the display substrate 300. In this case, the display substrate 300 serves as the carrier panel 203.

Referring to FIG. 11, the display substrate 300 has a display region SS. The display region SS is provided with a plurality of sub-pixels P therein, the sub-pixels P are each a minimum unit of the display substrate 300 for performing image display, and each sub-pixel P may display a single color, such as a red color (R), a green color (G) or a blue color (B). The display substrate 300 is provided with red sub-pixels, green sub-pixels and blue sub-pixels therein, so as to adjust luminance (gray scales) of sub-pixels of different colors. Thus, display of a plurality of colors may be achieved by a color combination and a color superimposition, so that the full-color display of the display substrate 300 is achieved.

The edges of the touch region AA of the touch layer group 200 substantially coincide with edges S1 (as shown in FIG. 11) of the display region SS.

As shown in FIG. 9, in a case where the touch display apparatus 100 is a liquid crystal touch display apparatus, the display substrate 300 is a liquid crystal display substrate 300A. A main structure of the liquid crystal display substrate 300A includes an array substrate 31, an opposite substrate 32, and a liquid crystal layer 33 disposed between the array substrate 31 and the opposite substrate 32.

As shown in FIG. 9, each sub-pixel in the array substrate 31 includes a thin film transistor 311 and a pixel electrode 312 that are located on a first substrate 310. The thin film transistor 311 includes an active layer, a source, a drain, a gate and a gate insulating layer, the source and the drain are in contact with the active layer, and the pixel electrode 312 is electrically connected to the drain of the thin film transistor 311. In some embodiments, as shown in FIG. 9, the array substrate 31 further includes a common electrode 313 disposed on the first substrate 310. The pixel electrode 312 and the common electrode 313 may be disposed in a same layer. In this case, the pixel electrode 312 and the common electrode 313 are each of a comb-tooth structure including a plurality of strip-shaped sub-electrodes. Alternatively, the pixel electrode 312 and the common electrode 313 may be disposed in different layers. In this case, as shown in FIG. 9, a first interlayer insulating layer 314 is provided between the pixel electrode 312 and the common electrode 313. In a case where the common electrode 313 is disposed between the thin film transistor 311 and the pixel electrode 312, as shown in FIG. 9, a second interlayer insulating layer 315 is provided between the common electrode 313 and the thin film transistor 311. In some other embodiments, the array substrate 31 includes no common electrode 313. In this case, the common electrode 313 may be located in the opposite substrate 32.

As shown in FIG. 9, the array substrate 31 further includes a planarization layer 316 disposed on a side of the thin film transistor 311 and the pixel electrode 312 away from the first substrate 310.

As shown in FIG. 9, the opposite substrate 32 includes a color filter layer 321 disposed on a second substrate 320. In this case, the opposite substrate 32 may be referred to as a color filter (CF) substrate. The color filter layer 321 includes at least red photoresist units, green photoresist units and blue photoresist units, and the red photoresist units, the green photoresist units and the blue photoresist units are opposite to the sub-pixels in the array substrate 31 in one-to-one correspondence. The opposite substrate 32 further includes black matrix patterns 322 disposed on the second substrate 320, and the black matrix patterns 322 are used for spacing the red photoresist units, the green photoresist units and the blue photoresist units.

As shown in FIG. 9, the liquid crystal display substrate 300A further includes an upper polarizer 34 disposed on a side of the opposite substrate 32 away from the liquid crystal layer 33 and a lower polarizer 35 disposed on a side of the array substrate 31 away from the liquid crystal layer 33.

As shown in FIG. 10, in a case where the touch display apparatus 100 is an electroluminescent touch display apparatus, the display substrate 300 is an electroluminescent display substrate 300B. For example, an OLED display substrate has advantages of light weight and small thickness, rollability, gorgeous color, high contrast, fast response speed and the like, and is one of the mainstream display substrates. In a case where the touch display substrate is the electroluminescent display substrate, the display substrate 300 is a flexible display substrate. In this case, the touch display apparatus may be manufactured as a flexible display apparatus.

As shown in FIG. 10, the electroluminescent display substrate 300B may include a substrate 36 for display and an encapsulation layer 37 used for encapsulating the substrate 36 for display. Here, the encapsulation layer 37 may be an encapsulation film or an encapsulation substrate.

As shown in FIG. 10, the sub-pixel includes a driving circuit and a light-emitting device that are disposed on a third substrate 360. The driving circuit includes a plurality of thin film transistors 311. The light-emitting device includes an anode 361, a light-emitting functional layer 362 and a cathode 363, and the anode 361 is electrically connected to a drain of a thin film transistor 311, serving as a driving transistor, of the plurality of thin film transistors 311. The electroluminescent display substrate 300B further includes a pixel definition layer 364, the pixel definition layer 364 includes a plurality of openings, and the light-emitting functional layer 362 is disposed in an opening. In some embodiments, the light-emitting functional layer 362 includes a light-emitting layer. In some other embodiments, in addition to the light-emitting layer, the light-emitting functional layer 362 further includes one or more of an electron transporting layer (ETL), an electron injection layer (EIL), a hole transporting layer (HTL) and a hole injection layer (HIL).

As shown in FIG. 10, the substrate 36 for display further includes a planarization layer 365 disposed between the driving circuit and the anode 361.

It can be seen from FIG. 10 that the first touch electrode 21 and the touch sub-electrode 221 are disposed on a light exit surface (i.e. the display surface 101) of the electroluminescent display substrate 300B. In this case, the bridging portion 222 may be disposed on a side of the first touch electrode 21 proximate to or away from the electroluminescent display substrate 300B. In a case where the bridging portion 222 is disposed on a side of the first touch electrode 21 proximate to the substrate 36 for display, the insulating layer 201 is disposed between the first touch electrode 21 and the touch sub-electrode 221 as a whole and the bridging portion 222.

In some embodiments, as shown in FIG. 10, the display substrate 300 further includes a buffer layer 38 disposed on the encapsulation layer 37, thereby preventing the encapsulation layer 37 from being damaged and scratched during the manufacturing of the first touch electrode 21 and the touch sub-electrode 221.

In some embodiments, as shown in FIG. 10, the electroluminescent display substrate 300B includes an active film layer 366, a first gate metal layer Gate1, a second gate metal layer Gate2, a first source-drain metal layer SD1 and a second source-drain metal layer SD2 that are sequentially disposed on the third substrate 360. The active film layer 366 and the first gate metal layer Gate1 are used for forming a part of the thin film transistors 311 in the driving circuit. The active film layer 366 and the second gate metal layer Gate2 are used for forming the remaining transistors 311 in the driving circuit, and the first gate metal layer Gate1 and the second gate metal layer Gate2 are used for forming a capacitor in the driving circuit. The first source-drain metal layer SD1 and the second source-drain metal layer SD2 include a plurality of signal lines each transmitting a signal to the driving circuit, such as data lines, initialization signal lines and power supply signal lines, which will not be listed one by one here.

Figure 14:
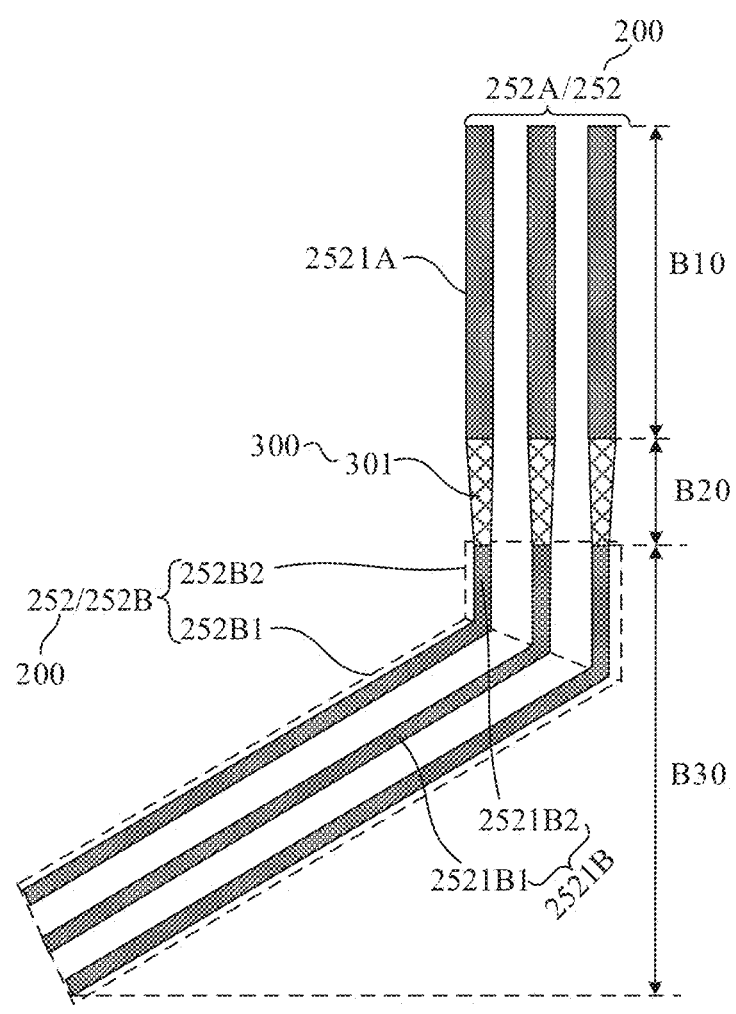
FIG. 14 is a structural diagram of second line segments and wire jumpers in a touch display apparatus, in accordance with some embodiments.

Based on the embodiments in which the display substrate 300 is the electroluminescent display substrate 300B, in some embodiments, as shown in FIG. 14, in a case where the touch layer group 200 includes the first second line segment 252A located in the first fan-out region B10 and the second second line segment 252B located in the lead-out region B30, a portion of the display substrate 300 corresponding to the bending region B20 is provided with a plurality of wire jumpers 301 therein; a shielding sub-line 2521A of the first second line segment 252A is electrically connected to a shielding sub-line 2521B of the second second line segment 252B via at least one wire jumper.

Firstly, it will be noted that, in some examples, the touch layer group 200 has the first fan-out region B10, the bending region B20, the lead-out region B30 and the bonding region B40, and the touch display apparatus 100 includes the touch layer group 200, so that the touch display apparatus 100 also has the first fan-out region B10, the bending region B20, the lead-out region B30 and the bonding region B40. The touch display apparatus 100 further includes the display substrate 300, so that the display substrate 300 also has the first fan-out region B10, the bending region B20, the lead-out region B30 and the bonding region B40. The first fan-out region B10 in the display substrate 300 and the first fan-out region B10 in the touch layer group 200 are a same region, the bending region B20 in the display substrate 300 and the bending region B20 in the touch layer group 200 are a same region, the lead-out region B30 in the display substrate 300 and the lead-out region B30 in the touch layer group 200 are a same region, and the bonding region B40 in the display substrate 300 and the bonding region B40 in the touch layer group 200 are a same region.

In some examples, as shown in FIG. 14, the second second line segment 252B includes the first sub-line segment 252B1 and the second sub-line segment 252B2, and the shielding sub-line 2521B includes the shielding sub-line 2521B1 and the shielding sub-line 2521B2. In this case, two ends of at least one wire jumper 301 of the plurality of wire jumpers 301 are electrically connected to the shielding sub-line 2521A and the shielding sub-line 2521B2, respectively.

The bending region B20 in the display substrate 300 may be bent, and a portion of the bending region B20, the lead-out region B30 and the bonding region B40 may be bent onto a back surface of the display substrate 300. In this way, a width of a frame of the display substrate 300 is reduced, so that a requirement of "small chin" in the display substrate 300 is satisfied.

The portion of the display substrate 300 corresponding to the bending region B20 has a relatively strong bending resistance. Therefore, it is possible to avoid a failure of the shielding line 25 caused by breakages of lines by making the wire jumper located in the display substrate 300 electrically connected to the shielding sub-line 2521A and the shielding sub-line 2521B.

The wire jumper used for being electrically connected to the shielding sub-line 2521A and the shielding sub-line 2521B is defined as a first wire jumper. In addition, the portion of the display substrate 300 corresponding to the bending region B20 is further provided with a plurality of second wire jumpers therein, and a portion of the first touch line 23 located in the first fan-out region B10 is electrically connected to a portion of the first touch line 23 located in the lead-out region B30 via a second wire jumper.

The portion of the display substrate 300 corresponding to the bending region B20 is further provided with a plurality of third wire jumpers therein, and a portion of the second touch line 24 located in the first fan-out region B10 is electrically connected to a portion of the second touch line 24 located in the lead-out region B30 via a third wire jumper.

The wire jumpers may be disposed in at least one of the first gate metal layer Gate1, the second gate metal layer Gate2, the first source-drain metal layer SD1 and the second source-drain metal layer SD2.

In some other embodiments, a portion of the touch layer group corresponding to the bending region B20 is provided with a sixth second line segment therein, and shielding sub-lines of the sixth second line segment each extend towards the direction far away from the touch region AA. In some examples, the sixth second line segment extends in the first designated direction F1. Ends, proximate to the touch region AA, of the shielding sub-lines of the sixth second line segment are electrically connected to the ends, away from the touch region AA, of the shielding sub-lines 2521A of the first second line segment 252A in one-to-one correspondence. The other ends, away from the touch region AA, of the shielding sub-lines of the sixth second line segment are electrically connected to the ends, proximate to the touch region AA, of the shielding sub-lines 2521B of the second second line segment 252B in one-to-one correspondence.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch layer group, having a touch region and a peripheral region;

the touch layer group comprising:

a plurality of first touch electrodes and a plurality of second touch electrodes that are located in the touch region;

a plurality of first touch lines electrically connected to the plurality of first touch electrodes, respectively; the plurality of first touch lines each extending to the peripheral region;

a plurality of second touch lines electrically connected to the plurality of second touch electrodes, respectively; the plurality of second touch lines each extending to the peripheral region; and a shielding line located in the peripheral region and located between a first touch line and a second touch line that are adjacent to each other; wherein the shielding line includes at least one first line segment and at least one second line segment; each second line segment includes a plurality of shielding sub-lines, and the plurality of shielding sub-lines of each second line segment each extend in a same direction and are spaced apart from one another; a plurality of shielding sub-lines of a second line segment are all electrically connected to a first line segment, and a width of a region where the plurality of shielding sub-lines of the second line segment are located is greater than a width of the first line segment; wherein the touch region includes a first edge, the peripheral region includes a first fan-out region connected to the first edge of the touch region;

the at least one second line segment includes a first second line segment, the first fan-out region is provided with the first second line segment therein, and all shielding sub-lines of the first second line segment each extend towards a direction far away from the touch region;

the at least one first line segment includes a first first line segment, the first fan-out region is further provided with the first first line segment therein, and the first first line segment extends along the first edge of the touch region; ends, proximate to the touch region, of all the shielding sub-line of the first second line segment are electrically connected to the first first line segment; and a width of the first first line segment is 1.3 to 1.7 times a width of any shielding sub-line of the first second line segment.

2. The touch layer group according to claim 1, wherein a width of a region where the first second line segment is located is 3 to 4.5 times a width of the first first line segment.

3. The touch layer group according to claim 1, wherein the touch region is substantially in a shape of a rectangle; the touch region includes the first edge, a second edge, a third edge and a fourth edge; wherein the first edge is opposite to the second edge, and the third edge is opposite to the fourth edge; a length of the first edge is equal to a length of the second edge, a length of the third edge is equal to a length of the fourth edge, and the length of the first edge is less than the length of the third edge;

a part of first touch lines of the plurality of first touch lines are led out to the first fan-out region from the first edge, and another part of first touch lines of the plurality of first touch lines are led out from the second edge and extend to the first fan-out region through a fourth side of the touch region; the plurality of second touch lines are led out to the first fan-out region from the third edge; the fourth side of the touch region is a portion of the peripheral region adjacent to the fourth edge;

portions, located in the first fan-out region, of the part of first touch lines and portions, located in the first fan-out region, of the plurality of second touch lines are respectively located on two sides of the shielding line.

4. The touch layer group according to claim 1, wherein the peripheral region includes a bending region located on a side of the first fan-out region away from the touch region, and a lead-out region located on a side of the bending region away from the first fan-out region;

the at least one second line segment includes a second second line segment, the lead-out region is provided with the second second line segment therein, and all shielding sub-lines of the second second line segment each extend towards a direction far away from the touch region.

5. The touch layer group according to claim 4, wherein at least portion of the second second line segment progressively approaches a central axis of the touch region from an end proximate to the touch region to another end away from the touch region.

6. The touch layer group according to claim 4, wherein the at least one second line segment further includes a third second line segment, the lead-out region is further provided with the third second line segment therein, the third second line segment substantially extends in a direction parallel to the first edge; ends of all shielding sub-lines of the third second line segment are respectively connected to ends, away from the touch region, of all the shielding sub-lines of the second second line segment.

7. The touch layer group according to claim 4, wherein the peripheral region further includes a bonding region located on a side of the lead-out region away from the bending region; wherein the bonding region is provided with ground pins therein; the at least one second line segment further includes a fourth second line segment, the lead-out region is further provided with the fourth second line segment, and the fourth second line segment extends towards the direction far away from the touch region; ends, away from the touch region, of all shielding sub-lines of the fourth second line segment are respectively connected to the ground pins, and another ends, proximate to the touch region, of all the shielding sub-lines of the fourth second line segment are respectively connected to another ends of all the shielding sub-lines of the third second line segment; or the peripheral region further includes a bonding region located on a side of the lead-out region away from the bending region; wherein the bonding region is provided with ground pins therein; the at least one second line segment further includes a fourth second line segment, the lead-out region is further provided with the fourth second line segment, and the fourth second line segment extends towards the direction far away from the touch region; ends, away from the touch region, of all shielding sub-lines of the fourth second line segment are respectively connected to the ground pins, and another ends, proximate to the touch region, of all the shielding sub-lines of the fourth second line segment are respectively connected to another ends of all the shielding sub-lines of the third second line segment; a distance between two adjacent shielding sub-lines of the fourth second line segment is greater than a distance between two adjacent shielding sub-lines of the third second line segment.

8. The touch layer group according to claim 6, wherein the peripheral region further includes a bonding region located on a side of the lead-out region away from the bending region; wherein the bonding region is provided with a ground pin therein; the at least one first line segment includes a second first line segment, the lead-out region is further provided with the second first line segment, the second first line segment extends towards the direction far away from the touch region; an end of the second first line segment is connected to the ground pin, and another end of the second first line segment is connected to all the shielding sub-lines of the third second line segment.

9. The touch layer group according to claim 8, wherein in the lead-out region, a difference between a width of the second first line segment and a width of any shielding sub-line is less than or equal to 40% of the width of the any shielding sub-line.

10. The touch layer group according to claim 9, wherein in the lead-out region, a difference between the width of the any shielding sub-line and a width of the first touch line is less than or equal to 40% of the width of the first touch line; and/or a difference between the width of the any shielding sub-line and a width of the second touch line is less than or equal to 40% of the width of the second touch line.

11. The touch layer group according to claim 1, wherein the width of the region where all the shielding sub-lines of the second line segment are located is 3 to 8 times the width of the first line segment.

12. The touch layer group according to claim 1, wherein each first touch electrode of the plurality of first touch electrodes is of a one-piece structure; each second touch electrode of the plurality of second touch electrodes includes a plurality of touch sub-electrodes and at least one bridging portion; two adjacent touch sub-electrodes of the second touch electrode are spaced apart by a single first touch electrode;

the touch layer group comprises an insulating layer and two conductive layers, wherein the insulating layer is located between the two conductive layers; wherein the plurality of first touch electrodes and the plurality of touch sub-electrodes are located in a conductive layer of the two conductive layers; bridging portions are located in another conductive layer of the two conductive layers, and a bridging portion is electrically connected to the two adjacent touch sub-electrodes through respective via holes in the insulating layer.

13. The touch layer group according to claim 12, wherein at least one shielding sub-line of the second line segment is of a single-layer line or a double-layer line;

in a case where the plurality of shielding sub-lines of the second line segment are each of the single-layer line, the plurality of shielding sub-lines are located in a same conductive layer, or the plurality of shielding sub-lines are located in the two conductive layers, at least one shielding sub-line located in one of the conductive layers at least partially overlaps with at least one shielding sub-line located in another of the conductive layers in a direction perpendicular to the touch layer group.

14. The touch layer group according to claim 1, comprising:

a plurality of first-type touch lines and a plurality of second-type touch lines; wherein the touch layer group comprises two conductive layers, the plurality of first-type touch lines and the plurality of second-type touch lines are respectively disposed in the two conductive layers, and a first-type touch line at least partially overlaps with a second-type touch line in a direction perpendicular to the touch layer group; the plurality of first-type touch lines include a part of the first touch lines and a part of the second touch lines, and the plurality of second-type touch lines include another part of the first touch lines and another part of the second touch lines.

15. A touch display apparatus, comprising:

a display substrate; and the touch layer group according to claim 1; wherein the touch layer group is located on a display surface of the display substrate; the display substrate has a display region; edges of the touch region of the touch layer group substantially coincide with edges of the display region.

16. The touch display apparatus according to claim 15, wherein the peripheral region includes a bending region located on a side of the first fan-out region away from the touch region, and a lead-out region located on a side of the bending region away from the first fan-out region; and a portion of the display substrate corresponding to the bending region is provided with a plurality of wire jumpers therein; a shielding sub-line of the first second line segment is electrically connected to a shielding sub-line of the second second line segment via at least one wire jumper.

17. A touch layer group, having a touch region and a peripheral region;

the touch layer group comprising:

a plurality of first touch electrodes and a plurality of second touch electrodes that are located in the touch region;

a plurality of first touch lines electrically connected to the plurality of first touch electrodes, respectively; the plurality of first touch lines each extending to the peripheral region;

a plurality of second touch lines electrically connected to the plurality of second touch electrodes, respectively; the plurality of second touch lines each extending to the peripheral region; and a shielding line located in the peripheral region and located between a first touch line and a second touch line that are adjacent to each other; wherein the shielding line includes at least one first line segment and at least one second line segment; each second line segment includes a plurality of shielding sub-lines, and the plurality of shielding sub-lines of each second line segment each extend in a same direction and are spaced apart from one another; a plurality of shielding sub-lines of a second line segment are all electrically connected to a first line segment, and a width of a region where the plurality of shielding sub-lines of the second line segment are located is greater than a width of the first line segment; wherein the touch region includes a first edge, the peripheral region includes a first fan-out region connected to the first edge of the touch region;

the at least one second line segment includes a first second line segment, the first fan-out region is provided with the first second line segment therein, and all shielding sub-lines of the first second line segment each extend towards a direction far away from the touch region;

the at least one first line segment includes a first first line segment, the first fan-out region is further provided with the first first line segment therein, and the first first line segment extends along the first edge of the touch region; ends, proximate to the touch region, of all the shielding sub-line of the first second line segment are electrically connected to the first first line segment;

the touch region is substantially in a shape of a rectangle; the touch region includes the first edge, a second edge, a third edge and a fourth edge; wherein the first edge is opposite to the second edge, and the third edge is opposite to the fourth edge; a length of the first edge is equal to a length of the second edge, a length of the third edge is equal to a length of the fourth edge, and the length of the first edge is less than the length of the third edge;

a part of first touch lines of the plurality of first touch lines are led out to the first fan-out region from the first edge, and another part of first touch lines of the plurality of first touch lines are led out from the second edge and extend to the first fan-out region through a fourth side of the touch region; the plurality of second touch lines are led out to the first fan-out region from the third edge; the fourth side of the touch region is a portion of the peripheral region adjacent to the fourth edge; and portions, located in the first fan-out region, of the part of first touch lines and portions, located in the first fan-out region, of the plurality of second touch lines are respectively located on two sides of the shielding line.

18. The touch layer group according to claim 17, wherein a portion, located in the first fan-out region, of at least one first touch line of the part of first touch lines includes a first touch sub-line and a second touch sub-line that are connected to each other; the first touch sub-line and the first first line segment extend in a same direction, and the second touch sub-line and the first second line segment extend in another same direction;

a portion, located in the first fan-out region, of at least one second touch line of the plurality of second touch lines includes a third touch sub-line and a fourth touch sub-line that are connected to each other; the third touch sub-line and the first first line segment extend in the same direction, and the fourth touch sub-line and the first second line segment extend in the another same direction;

the first touch sub-line and the third touch sub-line are respectively located on two sides of the first first line segment, and the second touch sub-line and the fourth touch sub-line are respectively located on two sides of the first second line segment.

19. The touch layer group according to claim 18, wherein a width of the first first line segment is 1.3 to 1.7 times a width of the first touch sub-line, and the width of the first first line segment is 2 to 6 times a width of the third touch sub-line; and/or a difference between a width of each shielding sub-line of the first second line segment and a width of the second touch sub-line is less than or equal to 40% of the width of the second touch sub-line; a difference between the width of each shielding sub-line of the first second line segment and a width of the fourth touch sub-line is less than or equal to 40% of the width of the fourth touch sub-line.

20. The touch layer group according to claim 17, wherein the plurality of first touch electrodes each extend in a first direction, the plurality of second touch electrodes each extend in a second direction, and the plurality of first touch electrodes cross and are insulated from the plurality of second touch electrodes; the first direction is a direction parallel to the third edge, and the second direction is a direction parallel to the first edge.

\* \* \* \* \*